(12) United States Patent
Yadav

(10) Patent No.: US 9,407,536 B1
(45) Date of Patent: Aug. 2, 2016

(54) COLLAPSED-DISTRIBUTED CLOS SWITCHING ARCHITECTURE FOR MULTI-CHASSIS FABRIC CONNECTIVITY

(71) Applicant: Juniper Networks, Inc., Sunnyvale, CA (US)

(72) Inventor: Alam Yadav, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 132 days.

(21) Appl. No.: 14/464,333

(22) Filed: Aug. 20, 2014

(51) Int. Cl.
*H04L 12/773* (2013.01)
*H04L 12/707* (2013.01)
*H04Q 3/68* (2006.01)

(52) U.S. Cl.
CPC ............... *H04L 45/24* (2013.01); *H04L 45/60* (2013.01); *H04Q 3/68* (2013.01)

(58) Field of Classification Search
None
See application file for complete search history.

(56) References Cited

U.S. PATENT DOCUMENTS

| | | | | |
|---|---|---|---|---|
| 6,795,432 | B1 * | 9/2004 | Lee | H04J 3/1611 370/238 |
| 8,050,559 | B2 | 11/2011 | Sindhu | |
| 2001/0024541 | A1 * | 9/2001 | Okayama | H04Q 11/0005 385/17 |

OTHER PUBLICATIONS

Cisco, "Cisco CRS Multichassis System Data Sheet," http://www.cisco.com/c/en/us/products/collateral/routers/carrier-routing-system/data_sheet_c78-726136.html, Jul. 28, 2014, 4 pages.
Wikipedia, "Clos Network," http://en.wikipedia.org/wiki/Clos_network, Jul. 28, 2014, 5 pages.
Wikipedia, "Crossbar switch," http://en.wikipedia.org/wiki/Crossbar_switch, Jul. 28, 2014, 7 pages.
Cisco, "Introduction to the CRS Back-to-Back System," *Cisco CRS Carrier Routing System 16-Slot Back-to-Back Cabling and Upgrade Guide*, 8 pages.
Wikipedia, "Nonblocking minimal spanning switch," http://en.wikipedia.org/wiki/Nonblocking_minimal_spanning_switch, Jul. 28, 2014, 8 pages.
Juniper Networks, *TX Matrix Plus Router: Hardware Guide*, Juniper Networks, Inc. Aug. 16, 2013, 732 pages.
Juniper Networks, Inc., "MX Series 3D Universal Edge Router— Ethernet—Juniper Networks", May 17, 2014, 2 pages.
Juniper Networks, Inc., "PTX Series Packet Transport Routers— Service Provider Core Network Routers—Juniper Networks", Jun. 24, 2013, 2 pages.

* cited by examiner

*Primary Examiner* — Daniell L Negron
(74) *Attorney, Agent, or Firm* — Harrity & Harrity, LLP

(57) ABSTRACT

A system may comprise a first device and a second device associated with a Clos architecture. The first device may include a first crossbar that comprises a first component, a second component, and a third component. The second device may include a second crossbar that comprises a fourth component, a fifth component, and a sixth component. The first component may connect to the second component and the fifth component. The second component may connect to the first component, the third component, the fourth component, and the sixth component. The third component may connect to the second component and the fifth component. The fourth component may connect to the second component and the fifth component. The fifth component may connect to the first component, the third component, the fourth component, and the sixth component. The sixth component may connect to the second component and the fifth component.

20 Claims, 20 Drawing Sheets

2 ND B2B Connection with 3 Stage Collapsed Distributed Clos Fabric

610

| #ND (L) | 2 |
|---|---|
| Crossbars Per LCC (r') | 2 |
| Total Crossbars (r) | 4 |
| Xbar Size (N x N) | 144 |
| CLOS Size C = (r x N/3) | 192 |
| Serdes Per Optics (s) | 16 |

620

| Total Serdes Reqd on Each Xbars | | | | |
|---|---|---|---|---|
| Dir | F1 | F2 | F3 | Total |
| Rx | 48 | 48 | 48 | 144 |
| Tx | 48 | 48 | 48 | 144 |

| IntraChassis Links | | InterChassis Optical Links | | Existing Solution (B2B) |
|---|---|---|---|---|
| Intra-Xbar Links | Inter-Xbar Links | Inter-Chassis Links | No. Optic Cables Required (Per LCC) | Total Optical Cables Required | No. Optics Cables Required |
| 24 | 24 | 48 | 6 | 6 | 6 |
| 2N/3r | (2N/3r) * (r'-1) | (r-r') * 2N/3r | r' * ((r-r') * 2N/3r)/s | Optic Cables * L /2 | (CLOS Size/2)/s |

**3 ND B2B Connection with 3 Stage
Collapsed Distributed Clos Fabric**

810 —

| #ND (L) | 3 |
|---|---|
| Crossbars Per LCC (r') | 2 |
| Total Crossbars (r) | 6 |
| Xbar Size (N x N) | 144 |
| CLOS Size C = (r x N/3) | 288 |
| Serdes Per Optics (s) | 16 |

820 —

| Total Serdes Reqd on Each Xbars | | | | |
|---|---|---|---|---|
| Dir | F1 | F2 | F3 | Total |
| Rx | 48 | 48 | 48 | 144 |
| Tx | 48 | 48 | 48 | 144 |

| IntraChassis Links | | InterChassis Optical Links | | Dedicated Middle Stage (Existing) |
|---|---|---|---|---|
| Intra-Xbar Links | Inter-Xbar Links | Inter-Chassis Links | No. Optic Cables Required (Per LCC) | Total Optical Cables Required | No. Optics Cables Required |
| 16 | 16 | 64 | 8 | 12 | 18 |
| 2N/3r | (2N/3r) * (r'-1) | (r-r') * 2N/3r | r' * ((r-r') * 2N/3r)/s | Optic Cables * L /2 | (L*(N/3)*r')/s |

**4 ND B2B Connection with 3 Stage
Collapsed Distributed Clos Fabric**

| #ND (L) | 4 |
|---|---|
| Crossbars Per LCC (r') | 2 |
| Total Crossbars (r) | 8 |
| Xbar Size (N x N) | 144 |
| CLOS Size C = (r x N/3) | 384 |
| Serdes Per Optics (s) | 16 |

1010

Total Serdes Reqd on Each Xbars

| Dir | F1 | F2 | F3 | Total |
|---|---|---|---|---|
| Rx | 48 | 48 | 48 | 144 |
| Tx | 48 | 48 | 48 | 144 |

1020

| IntraChassis Links | | InterChassis Optical Links | | Dedicated Middle Stage (Existing) |
|---|---|---|---|---|
| Intra-Xbar Links | Inter-Xbar Links | Inter-Chassis Links | No. Optic Cables Required (Per LCC) | Total Optical Cables Required | No. Optics Cables Required |
| 12 | 12 | 72 | 9 | 18 | 24 |
| 2N/3r | (2N/3r) * (r'-1) | (r-r') * 2N/3r | r' * ((r-r') * 2N/3r)/s | Optic Cables * L /2 | (L*(N/3)*r)/s |

**3 ND B2B Connection with 3 Stage
Collapsed Distributed Clos Fabric**

| | |
|---|---|
| #CLOS Stages | 3 |
| #ND (L) | 3 |
| Crossbars For NDs (r') | 2, 3, 1 |
| Total Crossbars ( r ) | 6 |
| Each Xbar Size (N x N) | 48 |
| CLOS Size (C = r x N/3) | 288 |
| Serdes Per Optics (s) | 16 |

1210

| Total Serdes Reqd on Each Xbars | | | | |
|---|---|---|---|---|
| Dir | F1 | F2 | F3 | Total |
| Rx | 48 | 48 | 48 | 144 |
| Tx | 48 | 48 | 48 | 144 |

1220

| | CrossBars for This ND (r'') | IntraChassis Links | | InterChassis Optical Links | |
|---|---|---|---|---|---|
| | | Intra-Xbar Links | Inter-Xbar Links | Inter-Chassis Links | |
| ND0 | 2 | 16 | 16 | 64 | |
| ND1 | 3 | 16 | 32 | 48 | |
| ND2 | 1 | 16 | 0 | 80 | |
| (r''') | | 2N/3r | (2N/3r) * (r' -1) | (r-r') * 2N/3r | |

| No. of Optical Cables Required | |
|---|---|
| ND0 - ND1 | $(2N/3r) * (r' * r'') / s$ |
| ND0 - ND2 | $(2N/3r) * (r' * r''') / s$ |
| ND1 - ND2 | $(2N/3r) * (r'' * r''') / s$ |
| Total | $(2N/3r) * ((r' * r'') + (r' * r''') + (r'' * r''')) / s$ |

1240

| Dedicated Middle Stage (Existing) | |
|---|---|
| No. of Optical Cables Required | |
| | $(N/3 * r')/s + (N/3 * r'')/s + (N/3 * r''')/s$ |

COLLAPSED-DISTRIBUTED CLOS SWITCHING ARCHITECTURE FOR MULTI-CHASSIS FABRIC CONNECTIVITY

BACKGROUND

A Clos architecture may include three stages: an ingress stage, a middle stage, and an egress stage. Each stage may comprise one or more crossbar switches, hereinafter referred to as crossbars. Information may enter the Clos architecture at any ingress crossbar, and may be routed, via any available middle stage crossbar, to an appropriate egress crossbar.

SUMMARY

According to some possible implementations, a system may include a first network device and a second network device associated with a Clos architecture. The first network device may include a first crossbar, associated with the Clos architecture, that comprises a first crossbar component; a second crossbar component; and a third crossbar component. The second network device may include a second crossbar, associated with the Clos architecture, that comprises a fourth crossbar component; a fifth crossbar component; and a sixth crossbar component. The first crossbar component may connect to the second crossbar component and the fifth crossbar component. The second crossbar component may connect to the first crossbar component, the third crossbar component, the fourth crossbar component, and the sixth crossbar component. The third crossbar component may connect to the second crossbar component and the fifth crossbar component. The fourth crossbar component may connect to the second crossbar component and the fifth crossbar component. The fifth crossbar component may connect to the first crossbar component, the third crossbar component, the fourth crossbar component, and the sixth crossbar component. The sixth crossbar component may connect to the second crossbar component and the fifth crossbar component.

According to some possible implementations, a system may include a first device and a second device associated with a Clos architecture. The first device may include a first crossbar, associated with the Clos architecture, that comprises a first crossbar component; a second crossbar component; and a third crossbar component. The second device may include a second crossbar, associated with the Clos architecture, that comprises a fourth crossbar component; a fifth crossbar component; and a sixth crossbar component. The first crossbar component may connect to the second crossbar component and the fifth crossbar component. The second crossbar component may connect to the first crossbar component, the third crossbar component, the fourth crossbar component, and the sixth crossbar component. The third crossbar component may connect to the second crossbar component and the fifth crossbar component. The fourth crossbar component may connect to the second crossbar component and the fifth crossbar component. The fifth crossbar component may connect to the first crossbar component, the third crossbar component, the fourth crossbar component, and the sixth crossbar component. The sixth crossbar component may connect to the second crossbar component and the fifth crossbar component.

According to some possible implementations, a system may include a first device, a second device, and a third device. The first device may include a first crossbar that comprises a first crossbar component; a second crossbar component; and a third crossbar component. The second device may include a second crossbar that comprises a fourth crossbar component; a fifth crossbar component; and a sixth crossbar component. The third device may include a third crossbar that comprises a seventh crossbar component; an eighth crossbar component; and a ninth crossbar component. The first crossbar component may connect to the second crossbar component, the fifth crossbar component, and the eighth crossbar component. The second crossbar component may connect to the first crossbar component, the third crossbar component, the fourth crossbar component, the sixth crossbar component, the seventh crossbar component, and the ninth crossbar component. The third crossbar component may connect to the second crossbar component, the fifth crossbar component, and the eighth crossbar component. The fourth crossbar component may connect to the second crossbar component, the fifth crossbar component, and the eighth crossbar component. The fifth crossbar component may connect to the first crossbar component, the third crossbar component, the fourth crossbar component, the sixth crossbar component, the seventh crossbar component, and the ninth crossbar component. The sixth crossbar component may connect to the second crossbar component, the fifth crossbar component, and the eighth crossbar component. The seventh crossbar component may connect to the second crossbar component, the fifth crossbar component, and the eighth crossbar component. The eighth crossbar component may connect to the first crossbar component, the third crossbar component, the fourth crossbar component, the sixth crossbar component, the seventh crossbar component, and the ninth crossbar component. The ninth crossbar component may connect to the second crossbar component, the fifth crossbar component, and the eighth crossbar component.

BRIEF DESCRIPTION OF THE DRAWINGS

FIG. 6 is a group of tables that include information associated with implementing the collapsed-distributed Clos architecture shown in FIGS. 5A and 5B;

FIG. 8 is a group of tables that include information associated with implementing the collapsed-distributed Clos architecture shown in FIGS. 7A and 7B;

FIG. 10 is a group of tables that include information associated with implementing the collapsed-distributed Clos architecture shown in FIGS. 9A and 9B;

FIGS. 12A and 12B are a group of tables that include information associated with implementing the collapsed-distributed Clos architecture shown in FIGS. 11A and 11B.

DETAILED DESCRIPTION

Figure 1A:
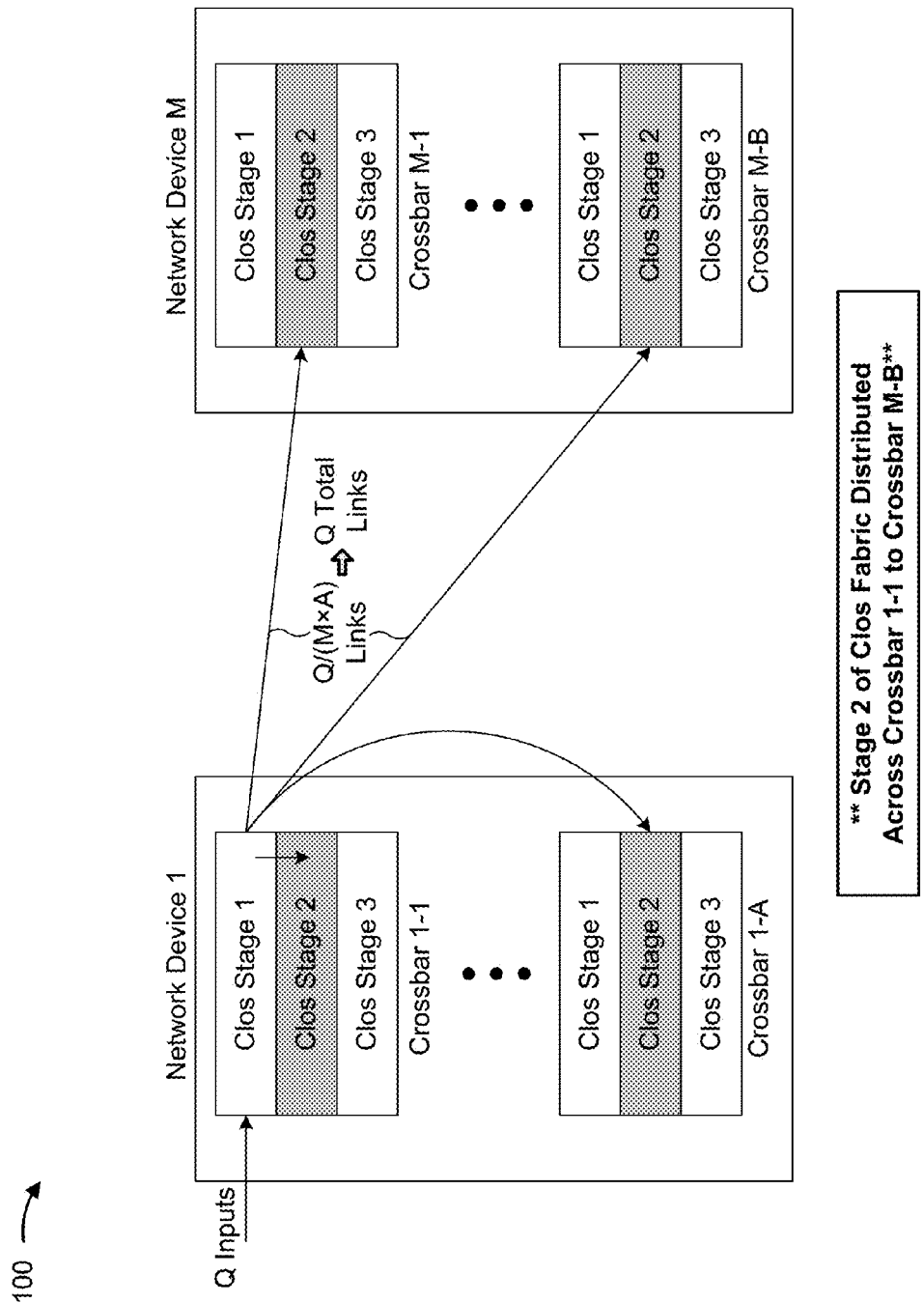
FIGS. 1A-1D are diagrams of an overview of an example implementation described herein.

The following detailed description of example implementations refers to the accompanying drawings. The same reference numbers in different drawings may identify the same or similar elements.

A multi-chassis system, such as a multi-chassis network device, may include two or more network devices connected using a multi-stage Clos architecture in which one or more Clos stages reside on one or more dedicated fabric chassis. In some implementations, a multi-chassis system may employ a three stage Clos architecture (e.g., including an ingress stage, a middle stage, and an egress stage), with either all of the three stages, or at least the middle stage, residing in one or more independent fabric chassis to which the individual network devices may connect to form the multi-chassis. However, in some deployments, the number of chassis that need to be connected, in order to form the multi-chassis system, may be relatively small (e.g., two line card chassis (LCCs), three LCCs, four LCCs, etc). In such cases, a multi-chassis system with the one or more dedicated middle stage fabric chassis may not be an attractive proposition due to capital expenditures and/or operational expenditures associated with such a system, and/or due to increased complexity associated with such a system (e.g., in terms of deployment, maintenance, etc.). In a case where only two network devices need to be connected (e.g., back-to-back (B2B)), the middle stage may be eliminated such that each network device includes only an ingress stage and an egress stage. However, implementing, a B2B connection in such a way may limit scalability of the connection in terms of switching capacity. Moreover, implementing a B2B connection in such a way may allow only two network devices to be connected.

Implementations described herein may provide a collapsed Clos architecture that partitions a crossbar of a network device, that needs to connect to one or more other crossbars via a three stage Clos fabric, such that the crossbar may act not only as the ingress stage and the egress stage of the Clos fabric, but also as a portion of the middle stage of the Clos fabric. In this way, all three stages of the Clos fabric may be collapsed into a single crossbar, and the middle stage may be distributed across multiple crossbars (e.g., on multiple network devices) that are connected together to form the multi-chassis system. The distribution of the middle stage of the Clos fabric may eliminate the need for a separate and/or dedicated middle stage fabric chassis while also reducing a total number of crossbars and required connections.

FIGS. 1A-1D are diagrams of an overview of an example implementation 100 described herein. For the purposes of example implementation 100, assume that multiple network devices (e.g., network device 1 through network device M) are to be connected using a three stage Clos architecture to form a multi-chassis system. Further, assume that network device 1 includes a set of crossbars (e.g., crossbar 1-1 through 1-A), and that network device M also includes a set of crossbars (e.g., crossbar M-1 through M-B).

As shown in FIG. 1A, each crossbar, included in each network device, may be partitioned such that each crossbar includes an ingress stage of the Clos fabric, an egress stage of the Clos fabric, and a portion of a middle stage of the Clos fabric (e.g., such that the middle stage of the Clos fabric is distributed across all crossbars). For clarity of example implementation 100, only those connections associated with crossbar 1-1 are shown. However, the connections described below may be repeated for each crossbar of FIG. 1.

As shown, stage 1 of crossbar 1-1 may be configured to receive (e.g., from input components of network device 1) packets via a quantity of Q inputs. As shown, stage 1 of crossbar 1-1 may be connected to a portion of stage 2 of the Clos fabric included in each crossbar of the multi-chassis system (e.g., stage 2 of crossbar 1-1, stage 2 of crossbar 1-A, stage 2 of crossbar M-1, stage 2 of crossbar M-B, etc.) in order to distributed the packets for switching. As shown, stage 1 of crossbar 1-1 may be connected such that stage 1 of crossbar 1-1 may distribute the packets via a total of Q links that are equally distributed to each portion of stage 2 of the Clos fabric (e.g., via Q/(M×A) links to each portion of stage 2).

Figure 1B:
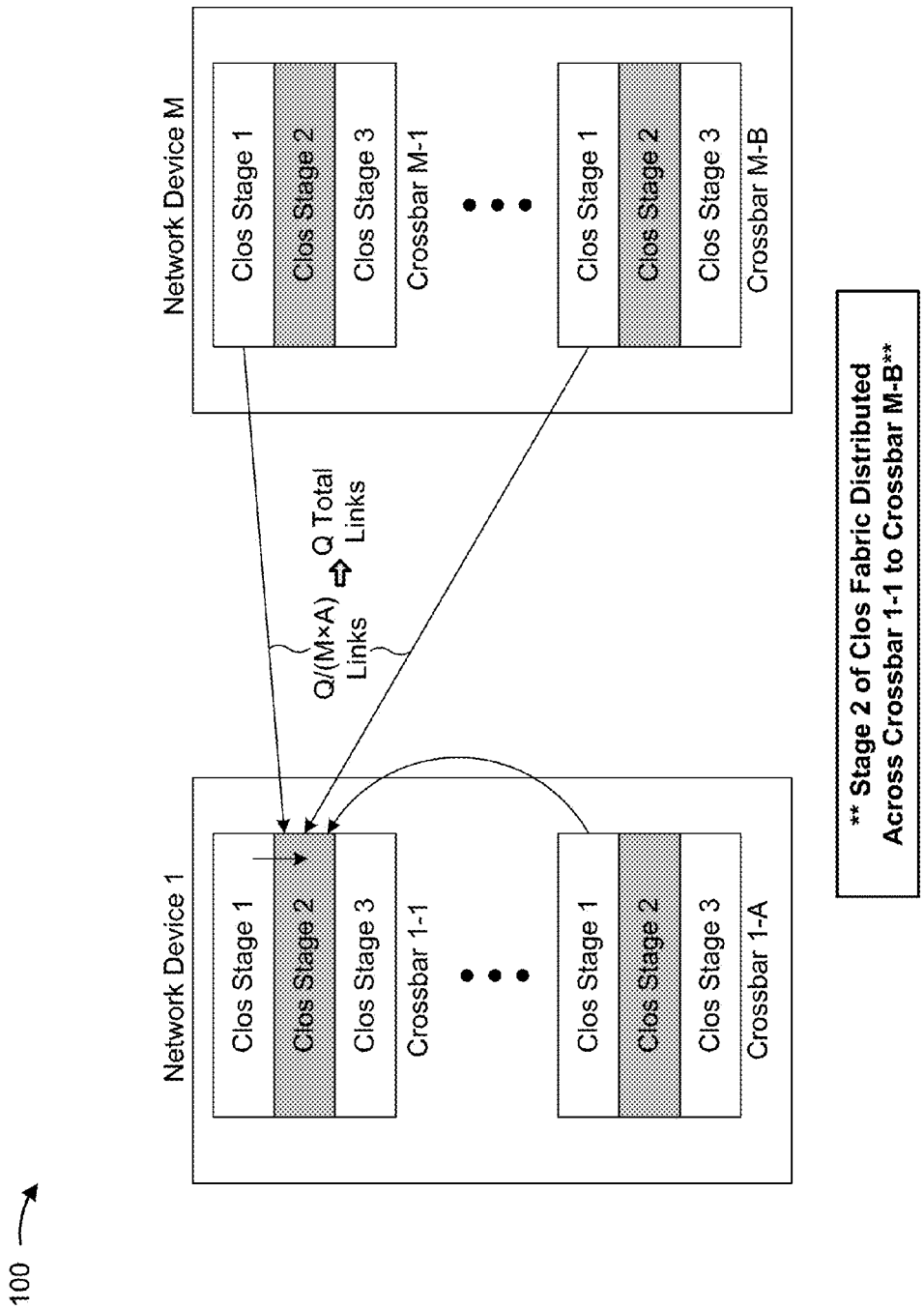

As shown in FIG. 1B, the portion of stage 2 of crossbar 1-1 may be configured to receive packets via a total of Q links. As shown, stage 2 of crossbar 1-1 may be connected to stage 1 of the Clos fabric included in each crossbar included in the multi-chassis system (e.g., stage 1 of crossbar 1-1, stage 1 of crossbar 1-A, stage 1 of crossbar M-1, stage 1 of crossbar M-B, etc.).

Figure 1C:
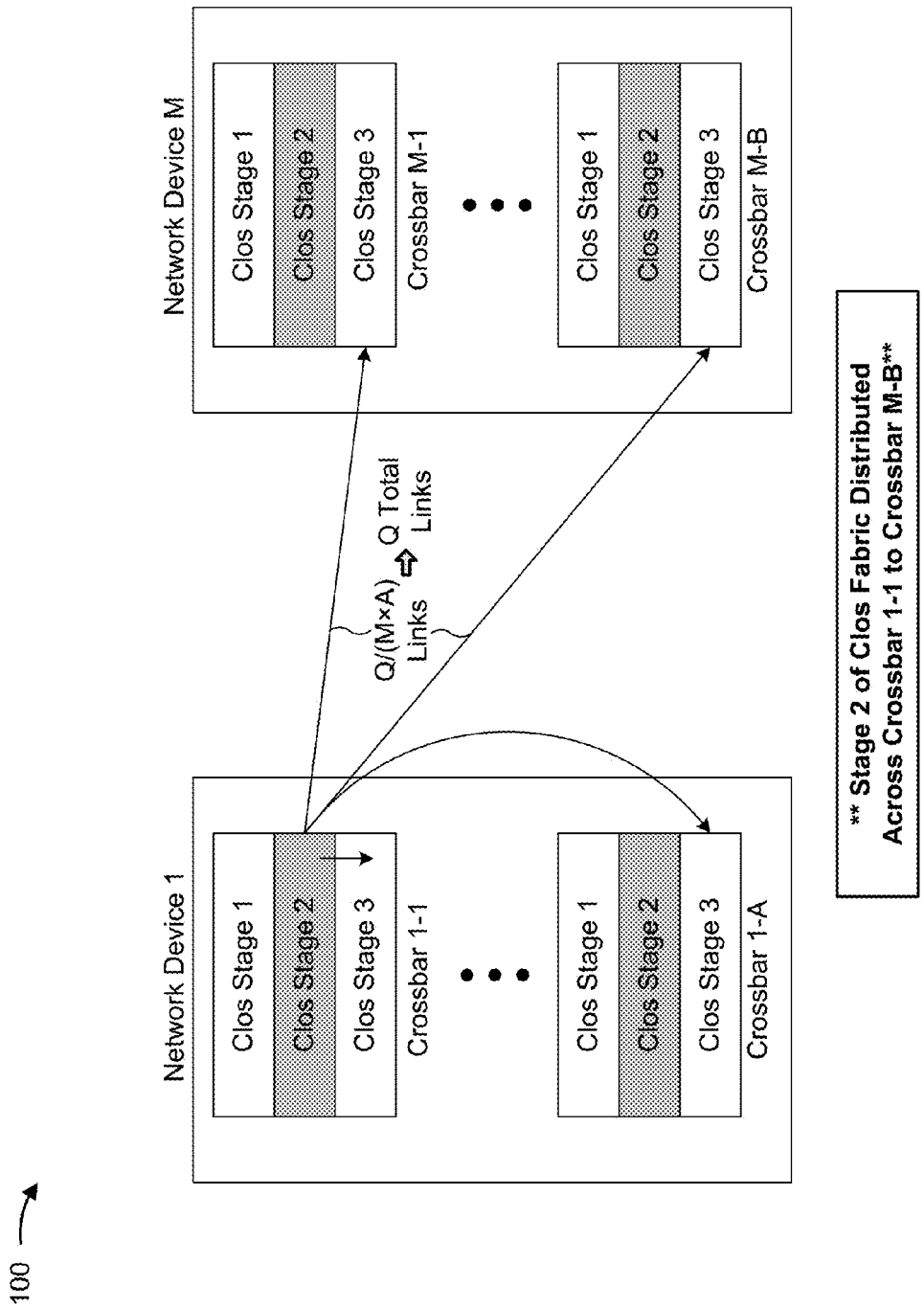

As shown in FIG. 1C, the portion of stage 2 of crossbar 1-1 may be connected to such that the portion of stage 2 may provide packets, via a total of Q links, to stage 3 of the Clos fabric included in each crossbar. As shown, stage 2 of crossbar 1-1 may be connected to stage 3 of the Clos fabric included in each crossbar of the multi-chassis system (e.g., stage 3 of crossbar 1-1, stage 3 of crossbar 1-A, stage 3 of crossbar M-1, stage 3 of crossbar M-B, etc.). As shown, stage 2 of crossbar 1-1 may be configured to distribute packets via a total of Q links that are equally distributed among each stage 3 of the Clos fabric (e.g., via Q/(M×A) links from stage 2 of crossbar 1-1 to each stage 3).

Figure 1D:
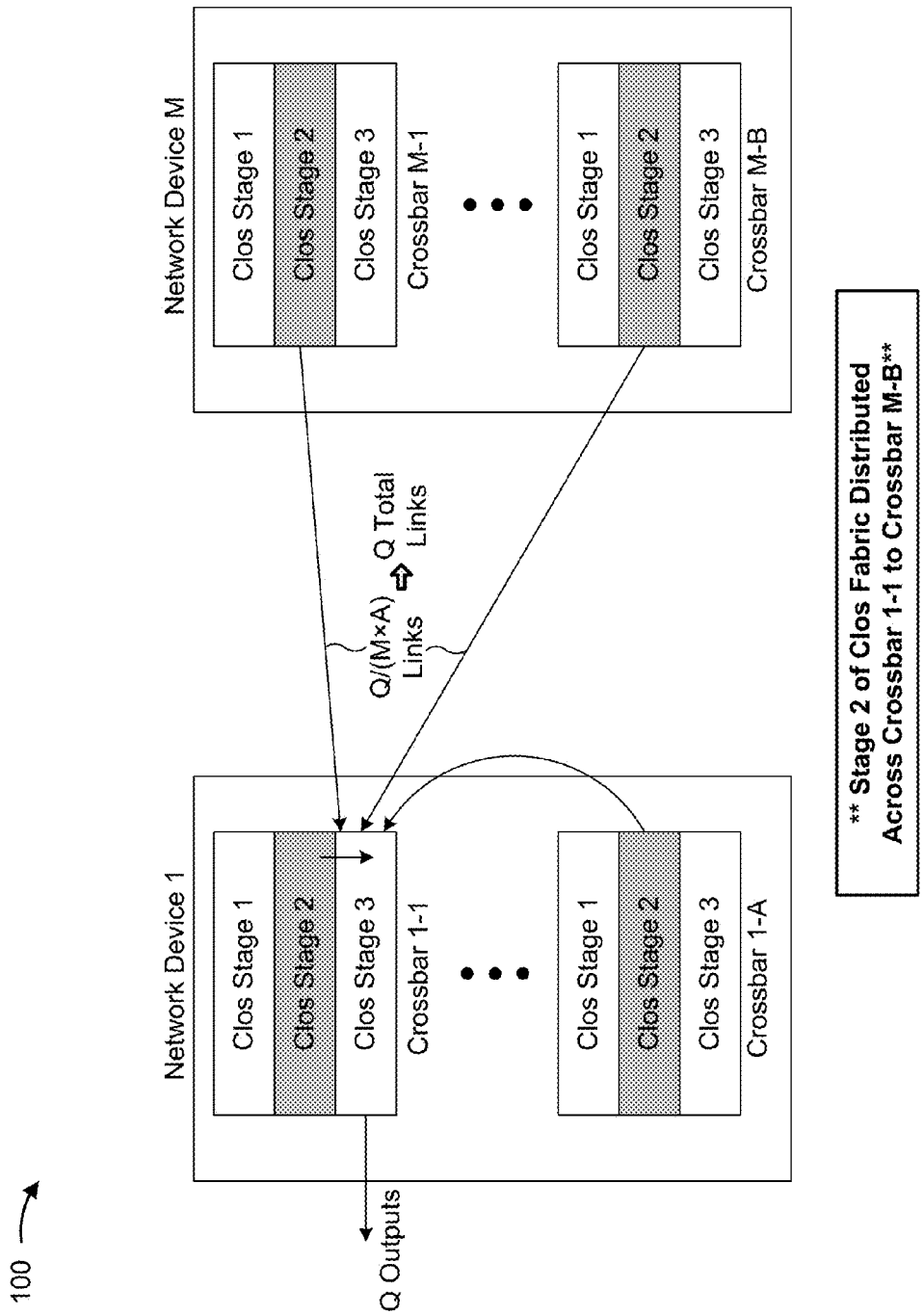

As shown in FIG. 1D, stage 3 of crossbar 1-1 may be configured to receive packets via a total of Q links. As shown, stage 3 of crossbar 1-1 may be connected to each portion of stage 2 of the Clos fabric in the multi-chassis system (e.g., stage 2 of crossbar 1-1, stage 2 of crossbar 1-A, stage 2 of crossbar M-1, stage 2 of crossbar M-B, etc.). As shown, stage 3 of crossbar 1-1 may be configured to provide (e.g., to output components of ND1) packets via a quantity of Q outputs.

In this way, a multi-chassis system may implement a collapsed three stage Clos architecture that partitions a crossbar of a network device, that needs to connect to one or more other crossbars via a three stage Clos fabric, such that the crossbar may act not only as the ingress stage and the egress stage of the Clos fabric, but also as a portion of the middle stage of the Clos fabric. As such, all three stages of the Clos fabric may be collapsed into a single crossbar, and the middle stage may be distributed across multiple crossbars (e.g., of multiple network devices) that are connected together to form the multi-chassis system. The implementation of collapsed-distributed Clos architecture may eliminate the need for a separate and/or dedicated middle stage fabric chassis while also reducing a total number of crossbars and required connections to form the multi-chassis system.

Figure 2:
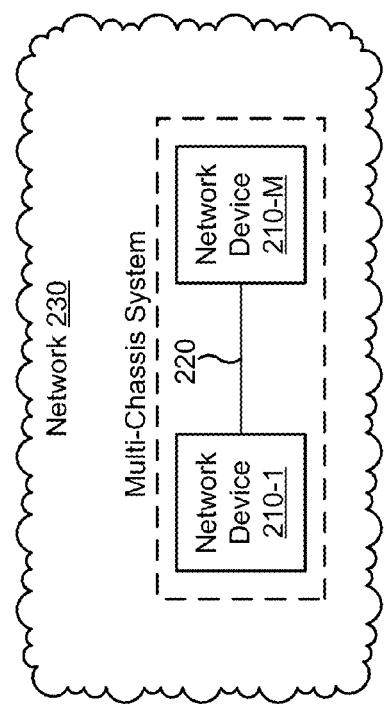
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include two or more network devices 210-1 through 210-M (M>1) (hereinafter referred to collectively as network devices 210, and individually as network device 210). In some implementations, network devices 210 may be connected (e.g., via a wired connection, via a wireless connection, or via a combination of a wired and wireless connection) via links 220. As shown, network devices 210 may be directly connected via links 220. In other words, in some implementations, no other device (e.g., a dedicated fabric chassis, etc.) may lie between network devices 210. As shown, network devices 210 may be included in network 230.

Network device 210 may include a device capable of receiving, transmitting, processing, routing, etc. packets travelling via network 230. For example, network device 210 may include an LCC, a router, a switch, a gateway, a modem, a firewall, a NIC, a hub, a bridge, an optical add-drop multiplexer (OADM), or another type of network device. In some implementations, network device 210 may include one or more input ports associated with receiving packets and one or more output ports associated with transmitting packets. In some implementations, network device 210 may be connected (e.g., via one or more links 220) to one or more other network devices 210 to form a multi-chassis system that implements a Clos architecture. For example, two or more network devices 210 (e.g., two or more LCCs) may be connected via one or more links 220 to form a multi-chassis system that implements a three stage, distributed-collapsed Clos architecture, as discussed in further detail below. In some implementations, network devices 210 may communicate with other devices included in network 230 (not shown) in order to process and/or route packets received by network devices 210.

Network 230 may include one or more wired and/or wireless networks that include network devices 210. For example, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks. In some implementations, network 230 may include multiple network devices 210 that are connected to form a multi-chassis system, as described above.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
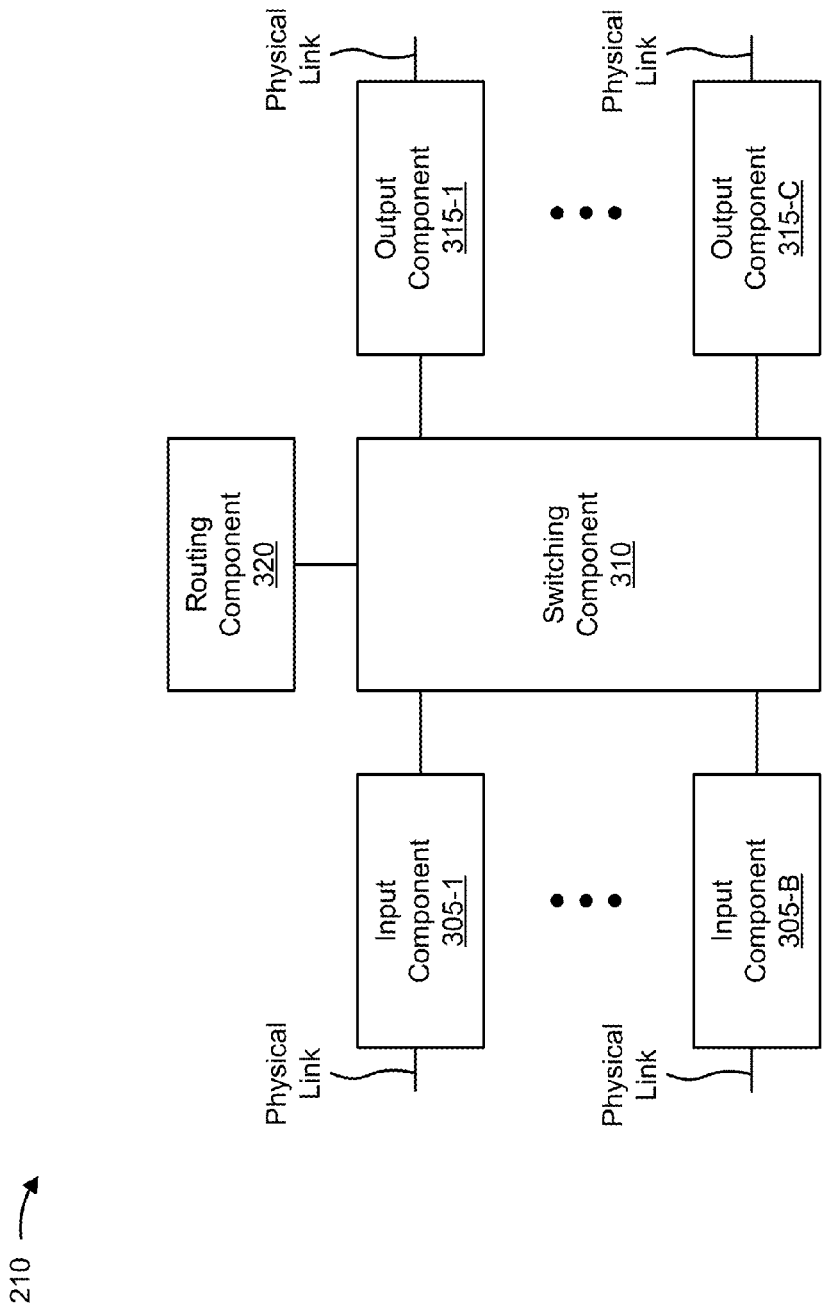
FIG. 3 is a diagram of example components of a network device shown in FIG. 2.

FIG. 3 is a diagram of example components of a network device 210. As shown in FIG. 3, network device 210 may include one or more input components 305-1 through 305-B (B>1) (hereinafter referred to collectively as "input components 305," and individually as "input component 305"), a switching component 310, one or more output components 315-1 through 315-C (C>1) (hereinafter referred to collectively as "output components 315," and individually as "output component 315"), and a routing component 320.

Input component 305 may be points of attachment for physical links and may be points of entry for incoming traffic, such as packets. Input components 305 may process incoming traffic, such as by performing data link layer encapsulation or decapsulation. In some implementations, input components 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, network device 210 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or routing component 320 to communicate.

In some implementations, switching component 310 may include one or more crossbars, and a crossbar may be partitioned such that the crossbar includes an ingress stage, a portion of a middle stage, and an egress stage associated with a Clos fabric that connects multiple network devices 210 to form a multi-chassis system. Additional details regarding switching component 310 are described below with regard to FIG. 4.

Output component 315 may store packets and may schedule packets for transmission on output physical links. Output components 315 may support data link layer encapsulation or decapsulation, and/or a variety of higher-level protocols. In some implementations, output components 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, network device 210 may include one or more output components 315.

Routing component 320 may include one or more processors, microprocessors, application-specific integrated circuits (ASICs), field programmable gate arrays (FPGAs), or similar types of processing components. In some implementations, routing component 320 may communicate with other devices, networks, and/or systems connected to network device 210 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

The number and arrangement of components shown in FIG. 3 is provided as an example. In practice, network device 210 may include additional components, fewer components, different components, or differently arranged components than those shown in FIG. 3. Additionally, or alternatively, a set of components (e.g., one or more components) of network device 210 may perform one or more functions described as being performed by another set of components of network device 210.

Figure 4:
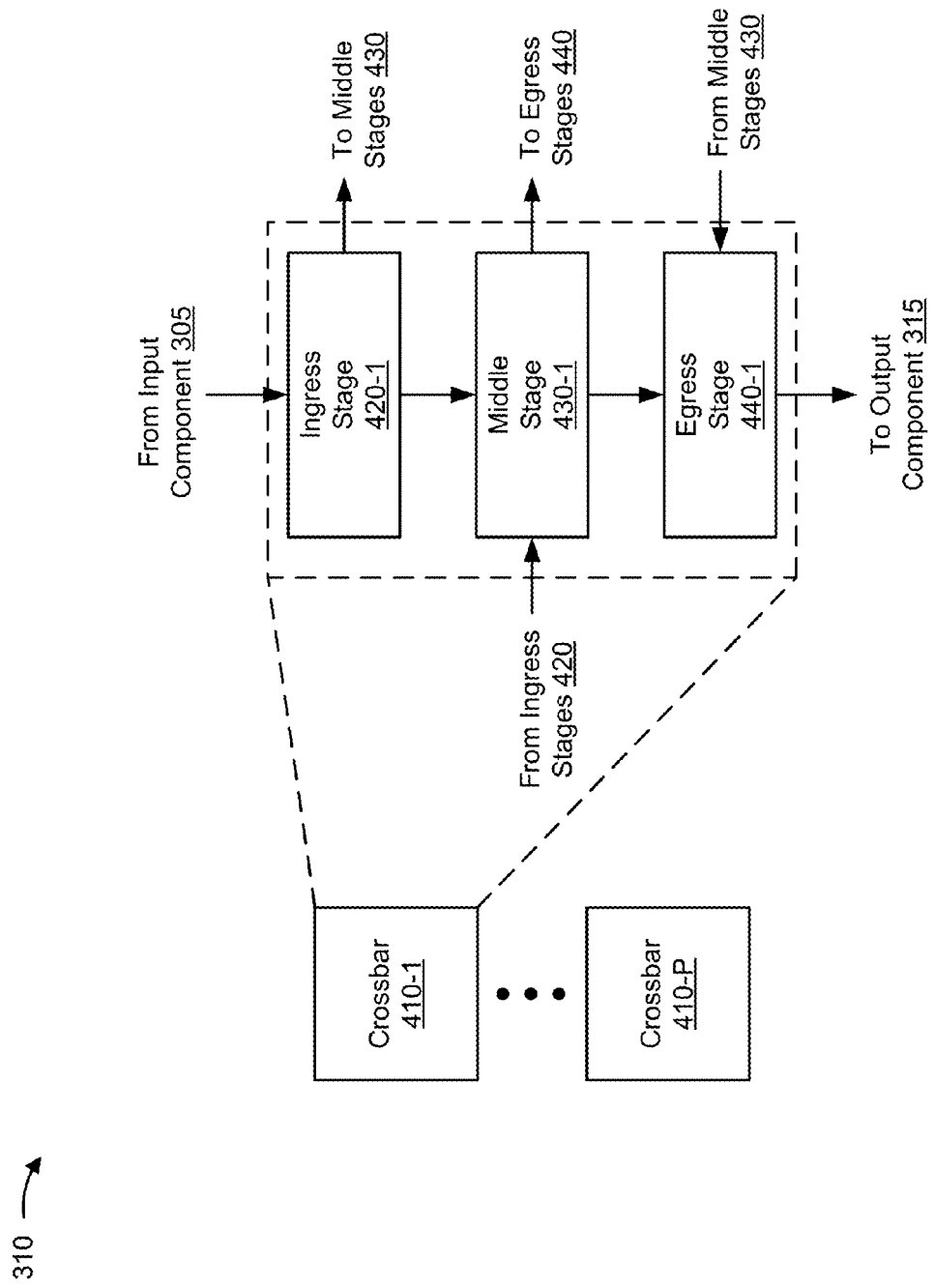
FIG. 4 is a diagram of example components of a switching component shown in FIG. 3.

FIG. 4 is a diagram of example components of a switching component 310 shown in FIG. 3. As shown, switching component 310 may include one or more crossbars 410-1 through 410-P (P>1) (hereinafter referred to collectively as crossbars 410, and individually as crossbar 410). As shown, crossbar 410 may be partitioned in an ingress stage 420, a middle stage 430, and an egress stage 440.

Ingress stage 420 may include a portion of crossbar 410 that is configured to act as an ingress stage of a Clos fabric associated with connecting two or more network devices 210 to form a multi-chassis system. In some implementations, ingress stage 420 may be configured to receive packets via one or more input components 305 and provide the packets to one or more middle stages 430. In some implementations, ingress stage 420 may be connected (e.g., via a wired connection, via a wireless connection, etc.) to one or more middle stages 430 associated with one or more crossbars 410. For example, ingress stage 420 (e.g., included in a first crossbar 410 of switching component 310 included in a first network device 210) may be connected to a first middle stage 430 (e.g., included in the first crossbar 410 of switching component 310 included in the first network device 210), a second middle stage 430 (e.g., included in a second crossbar 410 of switching component 310 included in the first network device 210), a third middle stage 430 (e.g., included in a first crossbar 410 of switching component 310 of a second network device 210), etc. In some implementations, each switching component 310 may include multiple crossbars 410 and multiple ingress stages 420, where each ingress stage 420 corresponds to a respective crossbar 410.

Middle stage 430 may include a portion of crossbar 410 that is configured to act as a portion of a middle stage of a Clos fabric, associated with connecting two or more network devices 210 to form a multi-chassis system, such that the middle stage of the Clos fabric is distributed among multiple middle stages 430 (e.g., across multiple network devices 210). In some implementations, middle stage 430 may be configured to receive packets from one or more ingress stages 420 and provide the packets to one or more egress stages 440. In some implementations, middle stage 430 may be connected (e.g., via a wired connection, via a wireless connection, etc.) to one or more ingress stages 420 and one or more egress stages 440. For example, middle stage 430 (e.g., included in a first crossbar 410 of switching component 310 included in a first network device 210) may be connected to a first ingress stage 420 and a first egress stage 440, (e.g., included in the first crossbar 410 switching component 310 included in the first network device 210), a second ingress stage 420 and a second egress stage 440 (e.g., included in a second crossbar 410 of switching component 310 included in the first network device 210), a third ingress stage 420 and a third egress stage 440 (e.g., included in a first crossbar 410 of switching component 310 included in a second network device 210), etc. In some implementations, each switching component 310 may include multiple crossbars 410 and multiple middle stages 430, where each middle stage 430 corresponds to a respective crossbar 410. As described herein, middle stage 430 of the Clos fabric may be distributed across multiple middle stages 430 (e.g., across multiple network devices 210).

Egress stage 440 may include a portion of crossbar 410 that is configured to act as an egress stage of a Clos fabric associated with connecting two or more network devices 210 to form a multi-chassis system. In some implementations, egress stage 440 may be configured to receive packets from one or more middle stages 430 and provide the packets via one or more output components 315. In some implementations, egress stage 440 may be connected (e.g., via a wired connection, via a wireless connection, etc.) to one or more middle stages 430. For example, egress stage 440 (e.g., included in a first crossbar 410 of switching component 310 included in a first network device 210) may be connected to a first middle stage 430 (e.g., included in the first crossbar 410 of switching component 310 included in the first network device 210), a second middle stage 430 (e.g., included in a second crossbar 410 of switching component 310 included in the first network device 210), a third middle stage 430 (e.g., included in a first crossbar 410 of switching component 310 included in a second network device 210), etc. In some implementations, each switching component 310 may include multiple crossbars 410 and multiple egress stages 440, where each egress stage 440 corresponds to a respective crossbar 410.

In some example implementations, a total quantity of r crossbars 410 (e.g., included in two or more network devices 210) may be partitioned to implement a three stage collapsed-distributed Clos fabric. In some implementations, network devices 210 included in a multi-chassis system may include equal numbers of crossbars 410 for the total quantity of r crossbars. For example, a first network device 210 that includes two crossbars 410 may be connected to a second network device 210 that includes two crossbars 410 for a total of four crossbars (e.g., r=4). Additionally, or alternatively, network devices 210 included in a multi-chassis system may include different numbers of crossbars 410 for the total quantity of r crossbars. For example, a first network device 210 that includes two crossbars 410 may be connected to a second network device 210 that includes three crossbars 410, and a third network device 210 that includes one crossbar 410, for a total of six crossbars (e.g., r=6).

The r crossbars may be of size N×N, and may be connected to form a Clos fabric of size r×N/3. The quantity of inputs, received by each ingress component 420, and a quantity of outputs, provided by each egress component 440, may be equal to N/3. A total quantity of links from each ingress stage 420 to a group of middle stages 430 may also be equal to N/3, and these links may be equally distributed over the r crossbars (e.g., such that there are N/(3×r) links from a particular ingress stage 420 to each middle stage 430). Similarly, a total quantity of links from each middle stage 420 to a group of egress stages 440 may be equal to N/3, and these links may be equally distributed over the r crossbars 410 (e.g., such that there are N/(3×r) links from a particular middle stage 430 to each egress stage 440). Hence, there may be a total of 2N/3 links toward the Clos fabric, and (e.g., due to the equal distribution of links) 2N/(3×r) links toward each of the r crossbars 410.

In some cases, a quantity of connections to be supported by each crossbar 410 may be increased as compared to implementing the three stage Clos fabric using a separate middle stage fabric chassis. However, if 2N/3 inter-chassis links may be associated with each crossbar 410, then scaling of a multi-chassis system implemented using the collapsed-distributed architecture may be unlimited. Continuing with the above example, there may be 2N/(3×r) intra-crossbar connections within a particular crossbar 410 (however, if N is not a multiple of 3r, then r−1 additional links may be required per crossbar 410). Therefore, any number of crossbars 410, from three to r, may be connected in B2B formation using the collapsed-distributed Clos architecture, so long as each crossbar 410 has a size of (N+(r−1))×(N+(r−1)), each crossbar 410 is connected to a total quantity of inputs equal to N/3, each crossbar 410 is connected to a total quantity of outputs equal to N/3, and each crossbar 410 includes a total quantity of (r−1)×2N/(3×r) inter-crossbar connections (e.g., connections to other crossbars 410), and each crossbar 410 includes a total quantity of 2N/(3×r) intra-crossbar connections. In such a case, the size of the Clos fabric may be equal to r×N/3. Specific examples of implementing a collapsed-distributed three stage Clos fabric to form a multi-chassis system are described below with regard to FIG. 5A through FIG. 10.

The number of components and arrangement shown in FIG. 4 are provided as an example. In practice, switching component 310 may include additional components, fewer components, different components, or differently arranged components than those shown in FIG. 4. Additionally, or alternatively, one or more components of switching component 310 may perform one or more functions described as being performed by another one or more components of switching component 310.

Figure 5A:
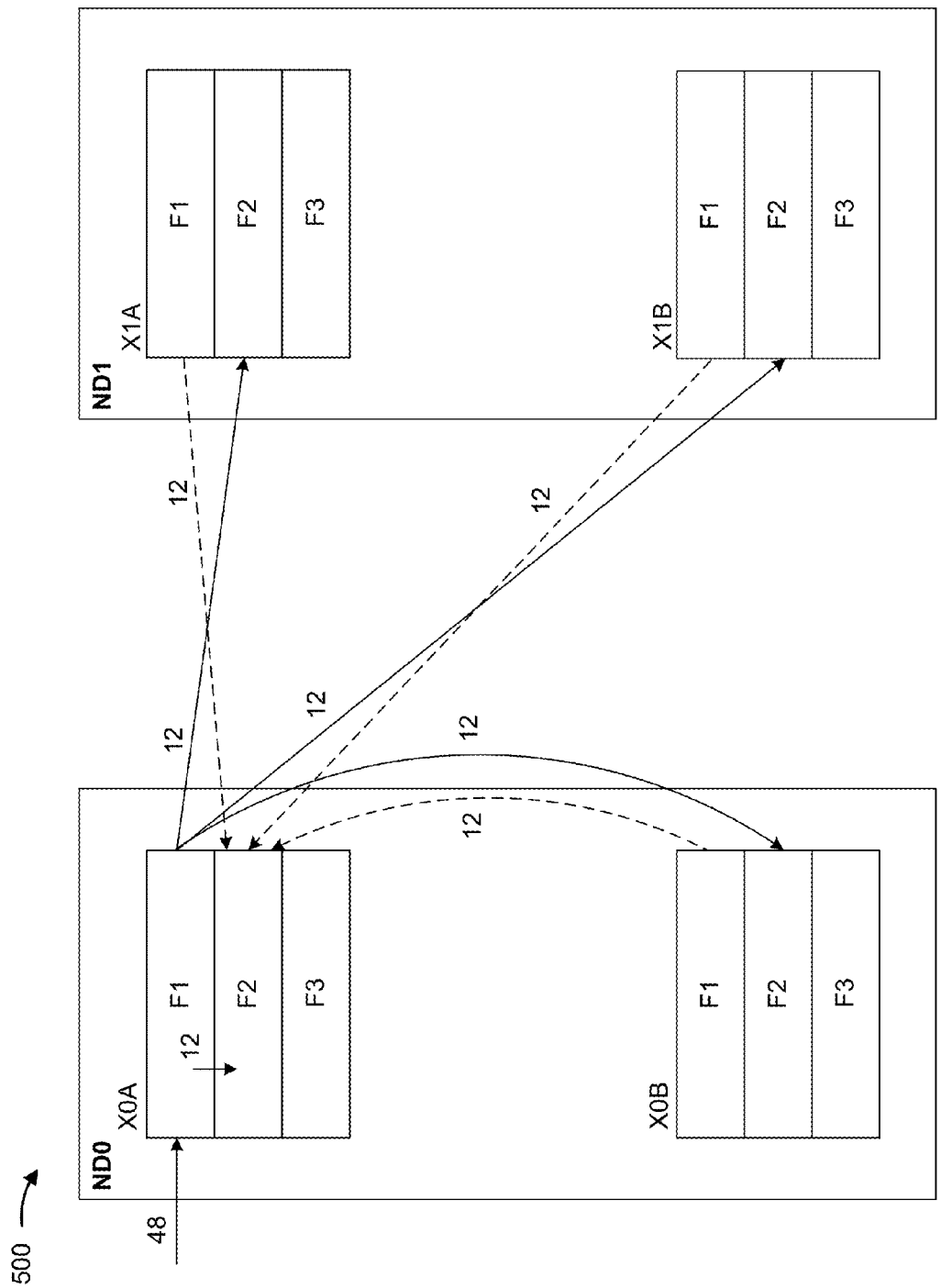
FIGS. 5A and 5B are diagrams of an example implementation of a multi-chassis system that implements a three stage collapsed-distributed Clos architecture for achieving back-to-back fabric connectivity between two network devices.
Figure 5B:
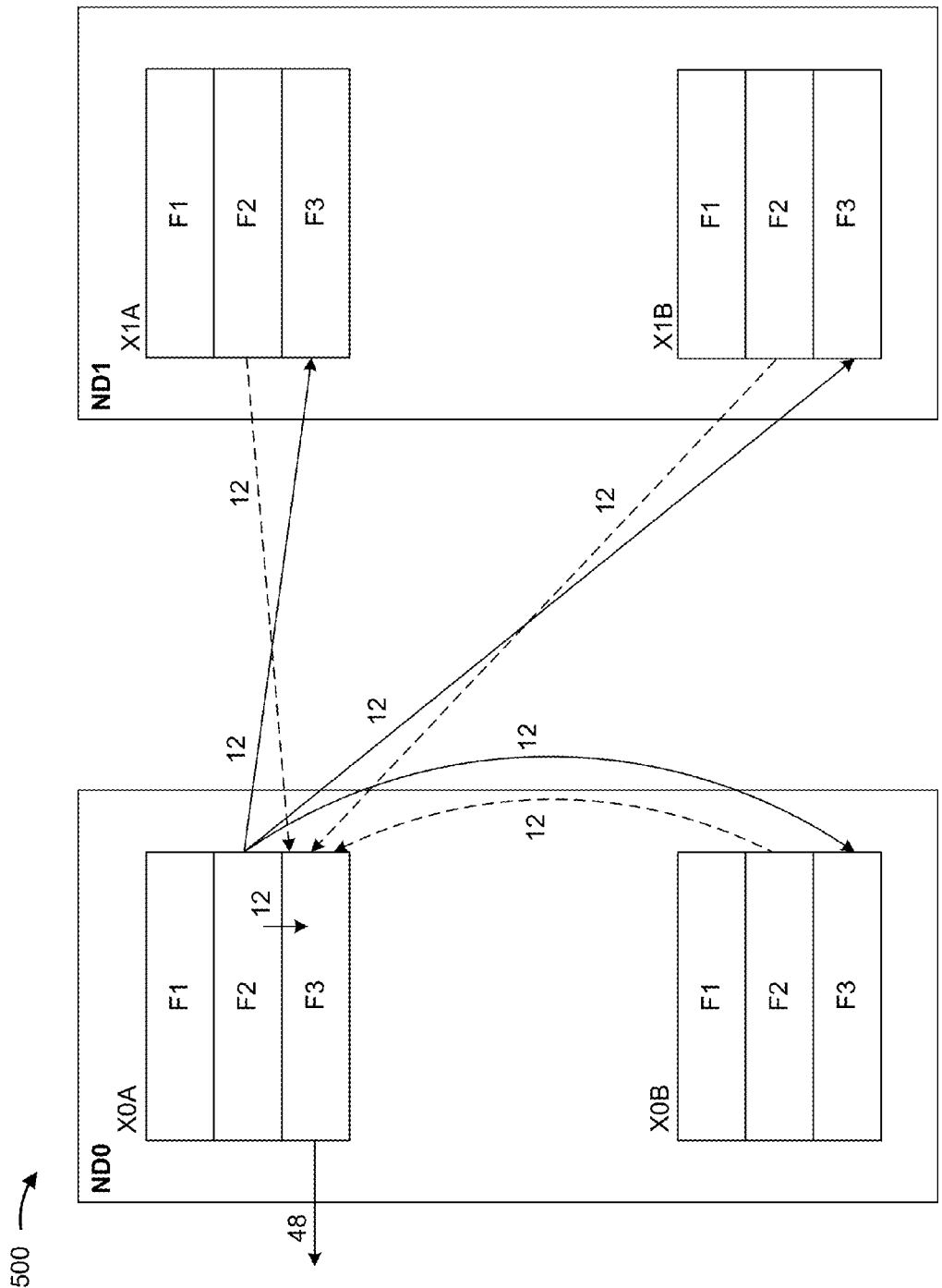

FIGS. 5A and 5B are diagrams of an example implementation 500 of a multi-chassis system that implements a three stage collapsed-distributed Clos architecture for achieving back-to-back fabric connectivity between two network devices (e.g., LCCs). For the purposes of example implementation 500, assume that a first network device 210, identified as ND0, includes a switching component 310 that comprises two crossbars 410, identified as X0A and X0B. Further, assume that a second network device 210, identified as ND1, includes a switching component 310 that comprises two crossbars 410, identified as X1A and X1B. Also, assume that the connections to, from, and/or between crossbars 410 are implemented using optical cables and optical links.

For purposes of simplicity, only those connections associated with X0A are shown in example implementation 500. However, each crossbar 410 included in example implementation 500 may include similar connections to those depicted for crossbar X0A. Furthermore, only one fabric plane, associated with switching component 310, is illustrated in example implementation 500, and additional parallel fabric planes may be implemented in a similar manner.

As shown in FIG. 5A, ND0 may be connected to ND1 using a B2B connection that implements a collapsed-distributed Clos architecture. For example, as shown, X0A, X0B, X1A, and X1B may be partitioned such that each crossbar 410 includes all three Clos stages (e.g., an ingress stage 420 (F1), a portion of middle stage 430 (F2), and an egress stage 440 (F3)), and such that middle stage 430, associated with the Clos fabric, is distributed across each crossbar 410 (e.g., since each crossbar 410 includes a portion of middle stage 430).

As shown, stage F1 on X0A (herein referred to as F1-X0A) may be connected such that F1-X0A may receive packets (e.g., from input components 305), via a total quantity of 48 input links, may provide the packets to all portions of the F2 stage included in the Clos fabric (e.g., assume that each crossbar 410 is size 144×144, thus each F1 stage may receive packets via 144/3=48 input links). In other words, F1-X0A may be connected such that F1-X0A may provide packets to F2-X0A via 12 intra-crossbar links, to F2-X0B via 12 intra-chassis links, to F2-X1A via 12 inter-chassis links, and to F2-X1B via 12 inter-chassis links.

As further shown in FIG. 5A, F2-X0A may be connected such that F2-X0A receives packets, via a total quantity of 48 input links, from each F1 included in the Clos fabric. In other words, F2-X0A may be connected such that F2-X0A may receive packets from F1-X0A via 12 intra-crossbar links (e.g., as described above), from F1-X0B via 12 intra-chassis links, from F1-X1A via 12 inter-chassis links, and from F1-X1B via 12 inter-chassis links.

As shown in FIG. 5B, F2-X0A may also be connected such that F2-X0A provides packets, via a total quantity of 48 input links, to each F3 included in the Clos fabric. In other words, F2-X0A may be connected such that F2-X0A may provide packets to F3-X0A via 12 intra-crossbar links, to F3-X0B via 12 intra-chassis links, to F3-X1A via 12 inter-chassis links, and to F3-X1B via 12 inter-chassis links.

As further shown in FIG. 5B, F3-X0A may be connected such that F3-X0A receives packets, via a total quantity of 48 input links, from each portion of the F2 stage included in the Clos fabric. In other words, F3-X0A may be connected such that F3-X0A may receive packets from F2-X0A via 12 intra-crossbar links (e.g., as described above), from F2-X0B via 12 intra-chassis links, from F2-X1A via 12 inter-chassis links, and from F2-X1B via 12 inter-chassis links. As shown, stage F3-X0A may be connected such that F3-X0A provides packets (e.g., to output components 315) via a total quantity of 48 input links.

As indicated above, FIGS. 5A and 5B are provided merely as an example. Other examples are possible and may differ from what was described with regard to FIGS. 5A and 5B.

FIG. 6 includes a group of tables 600 that provide information associated with a quantity of optical links and optical cables required to implement the collapsed-distributed Clos architecture shown in example implementation 500 of FIGS. 5A and 5B.

As shown in FIG. 6 by table 610, and in accordance with example implementation 500, each of the two network devices (L=2) includes two crossbars 410 (e.g., r'=2), for a total of four crossbars 410 (e.g., r=4). Further, each crossbar 410 may be of size 144×144 (e.g., N=144), resulting in an overall Clos size of 192×192 (e.g., r×N/3=4×144/3=192). For the purposes of FIG. 6, assume that each optical cable that may be used to establish inter-chassis links includes 16 serializer/deserializers (serdes) (e.g., s=16). As shown by table 620, assume that a total quantity of serdes (e.g., for the receive direction and the transmit direction) for each crossbar is 144 (e.g., N/3+N/3+N/3=48+48+48=144).

As shown by table 630, each crossbar 410 included in the two network device B2B connections may include a quantity of 24 intra-crossbar (e.g., intra-chip) links (e.g., 2N/3r=2×144/3×4=24), a quantity of 24 inter-crossbar (e.g., inter-chip) links (e.g., 2N/3r×(r'−1)=(2×144/3×4)×(2−1)=24), and a quantity of 48 inter-chassis links (e.g., (r−r')×2N/3r=(4−2)×2×144/3×4=48). As further shown, the number of optical cables, per network device, for the two network device B2B connection is 6 (e.g., r'×((r−r)×2N/3r)/s=2×((4−2)×2×144/3×4)/16=6), and the total quantity of optical cables for two network device B2B connection is 6 (e.g., Optic Cables per LCC×L/2=6×2/2). As further shown, the number of optical cables required for implementing the traditional B2B solution is also 6. Thus, as shown, the number of optical cables to implement the two network device B2B connections using the collapsed-distributed three stage Clos fabric is equal to the number of optical cables to implement a traditional B2B solution. However, the two network device B2B connections that uses the collapsed-distributed three stage Clos fabric allow for improved scalability of the multi-chassis system in terms of both switching capacity and in terms of the quantity of network devices that may be connected using the B2B implementation. Additionally, for a B2B connection that uses the traditional solution, the size of a crossbar needed for a Clos fabric of size C (e.g., C=r×N/3) is C. However, for a B2B connection that uses the collapsed-distributed three stage Clos fabric solution, the size of a crossbar needed for a Clos fabric of size C is N. Thus, for cases where r>3, the size of the crossbar needed to implement the traditional solution is larger than the size of the crossbar need to implement the collapsed-distributed three stage Clos fabric solution.

Figure 7A:
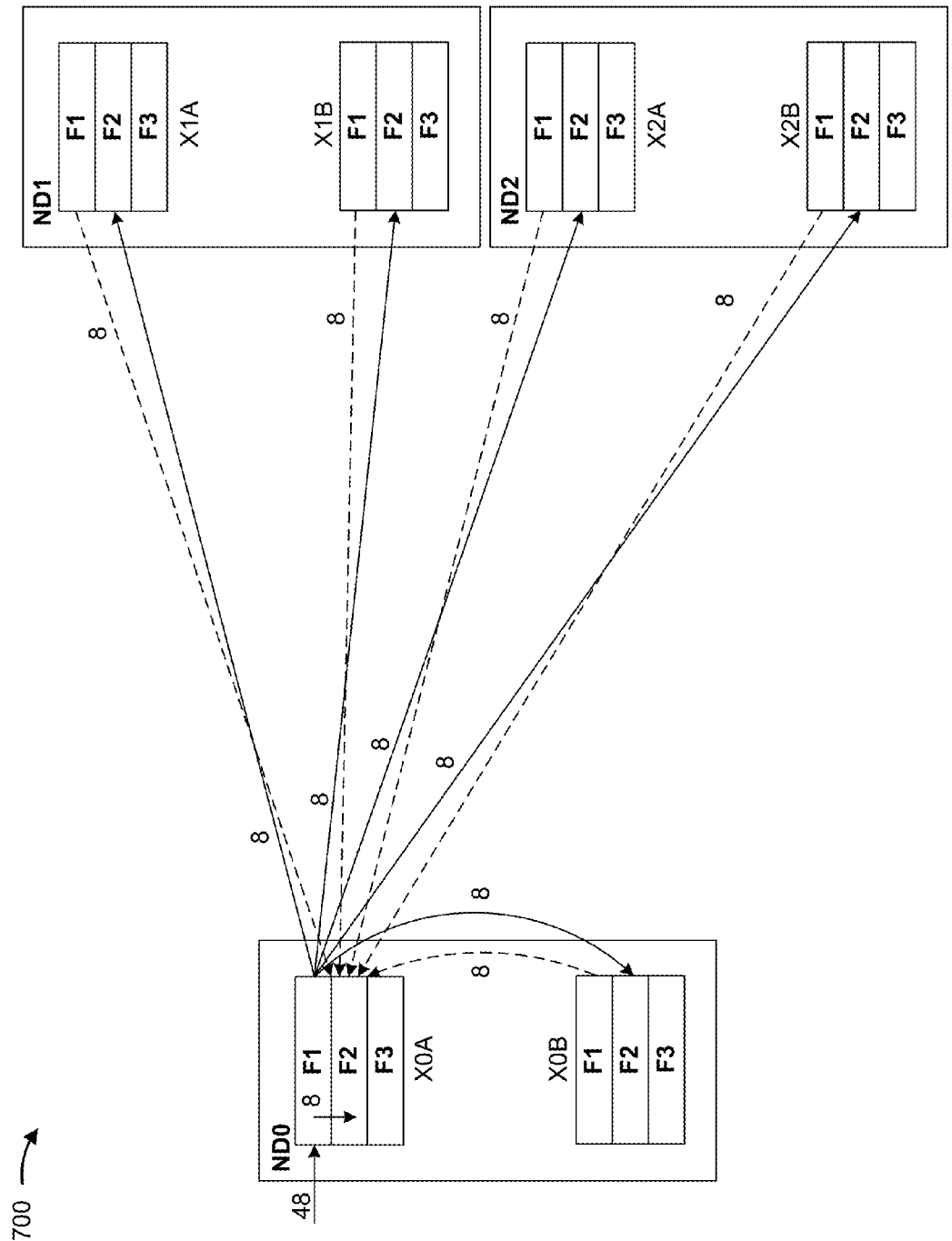
FIGS. 7A and 7B are diagrams of an example implementation of a multi-chassis system that implements a three stage collapsed-distributed Clos architecture for achieving back-to-back fabric connectivity among three network devices.
Figure 7B:
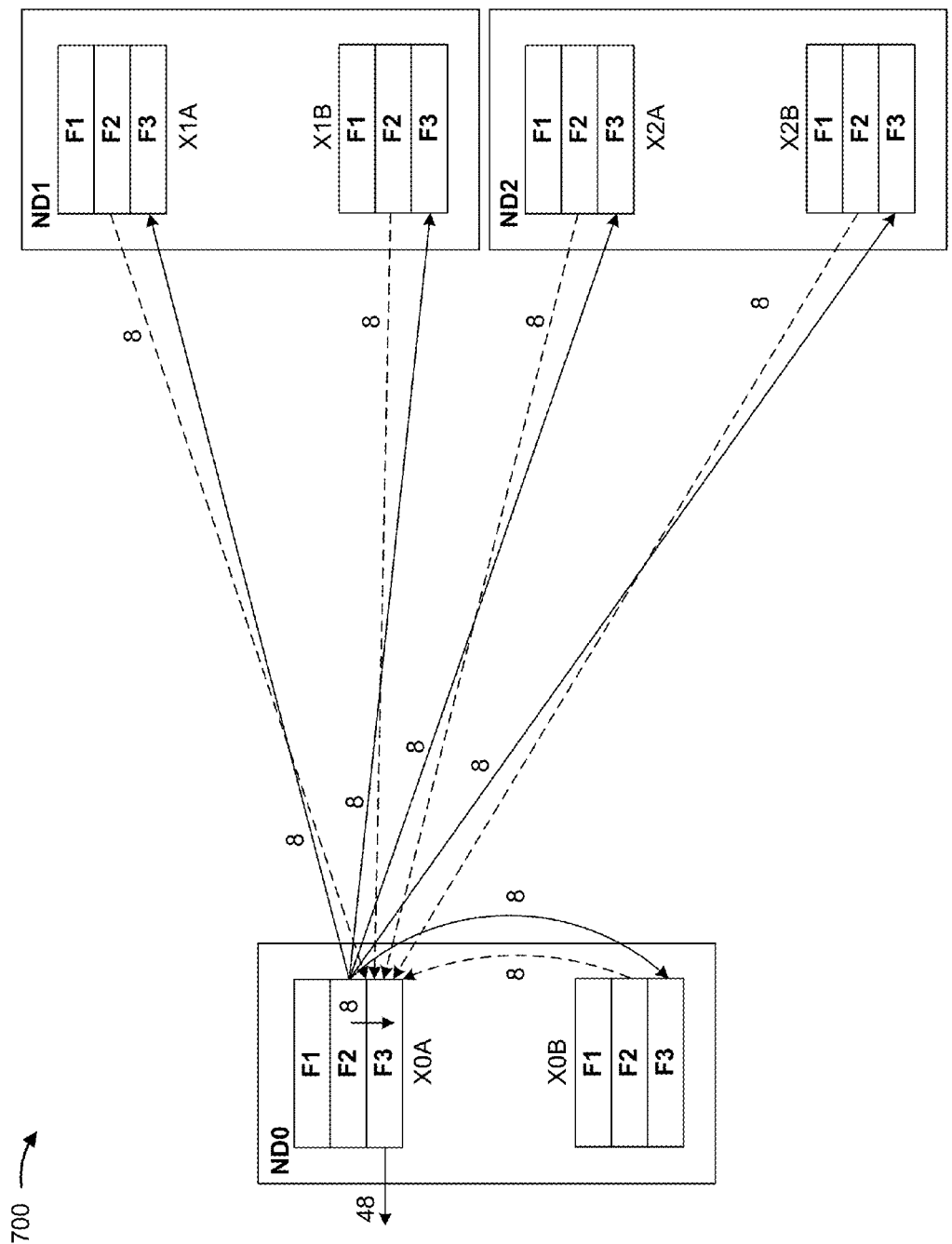

FIGS. 7A and 7B are diagrams of an example implementation 700 of a multi-chassis system that implements a three stage collapsed-distributed Clos architecture for achieving back-to-back fabric connectivity among three network devices. For the purposes of example implementation 700, assume that a first network device 210, identified as ND0, includes a switching component 310 that comprises two crossbars 410, identified as X0A and X0B, that a second network device 210, identified as ND1, includes a switching component 310 that comprises two crossbars 410, identified as X1A and X1B, and that a third network device 210, identified as ND2, includes a switching component 310 that comprises two crossbars 410, identified as X2A and X2B. Also, assume that the connections to, from, and/or between crossbars 410 are implemented using optical cables and optical links.

For purposes of simplicity, only those connections associated with X0A are shown in example implementation 700. However, each crossbar 410 included in example implementation 700 may include similar connections to those depicted for crossbar X0A. Furthermore, only one fabric plane, associated with switching component 310, is illustrated in example implementation 700, and additional parallel fabric planes may be implemented in a similar manner.

As shown in FIG. 7A, ND0 may be connected to ND1 and ND2 using a B2B connection that implements a collapsed-distributed Clos architecture. For example, as shown, X0A, X0B, X1A, X1B, X2A, and X2B may be partitioned such that each crossbar 410 includes all three Clos stages (e.g., an ingress stage 420 (F1), a portion of middle stage 430 (F2), and an egress stage 440 (F3)), and such that middle stage 430, associated with the Clos fabric, is distributed across each crossbar 410 (e.g., since each crossbar 410 includes a portion of middle stage 430).

As shown, stage F1 on X0A (herein referred to as F1-X0A) may be connected such that F1-X0A may receive packets (e.g., from input components 305), via a total quantity of 48 input links (e.g., assume that each crossbar 410 is size 144×144, thus each F1 stage may receive packets via 144/3=48 input links), and may provide the packets to all portions of the F2 stage included in the Clos fabric. In other words, F1-X0A may be connected such that F1-X0A may provide packets to F2-X0A via 8 intra-crossbar links, to F2-X0B via 8 intra-chassis links, to F2-X1A via 8 inter-chassis links, to F2-X1B via 8 inter-chassis links, to F2-X2A via 8 inter-chassis links, and to F2-X2B via 8 inter-chassis links.

As further shown in FIG. 7A, F2-X0A may be connected such that F2-X0A receives packets, via a total quantity of 48 input links, from each F1 included in the Clos fabric. In other words, F2-X0A may be connected such that F2-X0A may receive packets from F1-X0A via 8 intra-crossbar links (e.g., as described above), from F1-X0B via 8 intra-chassis links, from F1-X1A via 8 inter-chassis links, from F1-X1B via 8 inter-chassis links, from F1-X2A via 8 inter-chassis links, and from F1-X2B via 8 inter-chassis links.

As shown in FIG. 7B, F2-X0A may also be connected such that F2-X0A provides packets, via a total quantity of 48 input links, to each F3 included in the Clos fabric. In other words, F2-X0A may be connected such that F2-X0A may provide packets to F3-X0A via 8 intra-crossbar links, to F3-X0B via 8 intra-chassis links, to F3-X1A via 8 inter-chassis links, to F3-X1B via 8 inter-chassis links, to F3-X2A via 8 inter-chassis links, and to F3-X2B via 8 inter-chassis links.

As further shown in FIG. 7B, F3-X0A may be connected such that F3-X0A receives packets, via a total quantity of 48 input links, from each portion of the F2 stage included in the Clos fabric. In other words, F3-X0A may be connected such that F3-X0A may receive packets from F2-X0A via 8 intra-crossbar links (e.g., as described above), from F2-X0B via 8 intra-chassis links, from F2-X1A via 8 inter-chassis links, from F2-X1B via 8 inter-chassis links, from F2-X2A via 8 inter-chassis links, and from F2-X2B via 8 inter-chassis links. As shown, stage F3-X0A may be connected such that F3-X0A provides packets (e.g., to output components 315) via a total quantity of 48 input links.

As indicated above, FIGS. 7A and 7B are provided merely as an example. Other examples are possible and may differ from what was described with regard to FIGS. 7A and 7B.

FIG. 8 includes a group of tables 800 that provide information associated with a quantity of optical links and optical cables required to implement the collapsed-distributed Clos architecture shown in example implementation 700 of FIGS. 7A and 7B.

As shown in FIG. 8 by table 810, and in accordance with example implementation 700, each of the three network devices (L=3) includes two crossbars 410 (e.g., r'=2), for a total of six crossbars 410 (e.g., r=6). Further, each crossbar 410 may be of size 144×144 (e.g., N=144), resulting in an overall Clos size of 288×288 (e.g., r×N/3=6×144/3=288). For the purposes of FIG. 8, assume that each optical cable, that may be used establish inter-chassis links, includes 16 serializer/deserializers (serdes) (e.g., s=16). As shown by table 820, a total quantity of serdes for each crossbar (e.g., for the receive direction and the transmit direction) is 144 (e.g., N/3+N/3+N/3=48+48+48=144).

As shown by table 830, each crossbar 410 included in the three network device B2B connections may include a quantity of 16 intra-crossbar (e.g., intra-chip) links (e.g., 2N/3r=2×144/3×6=16), a quantity of 16 inter-crossbar (e.g., inter-chip) links (e.g., 2N/3r×(r'−1)=(2×144/3×6)×(2−1) =16), and a quantity of 64 inter-chassis links (e.g., (r−r')×2N/3r=(6−2)×2×144/3×6=64). As further shown, the number of optical cables, per network device, for the three network device B2B connection is 8 (e.g., r'×((r−r)×2N/3r)/s=2×((6−2)×2×144/3×6)/16=8), and the total quantity of optical cables for the three network device B2B connection is 12 (e.g., Optic Cables per LCC×L/2=8×3/2). Thus, as shown, the number of optical cables to implement the three network device B2B connections using the collapsed-distributed three stage Clos fabric is less than the number of optical cables to implement a traditional solution that uses an independent fabric chassis for the middle stage of the Clos fabric (e.g., 18). Moreover, the collapsed distributed solution may allow for decreased capital expenditures, decreased operational expenditures, and/or or decreased system complexity than the traditional solution by eliminating the need for one or more separate fabric chassis.

Figure 9A:
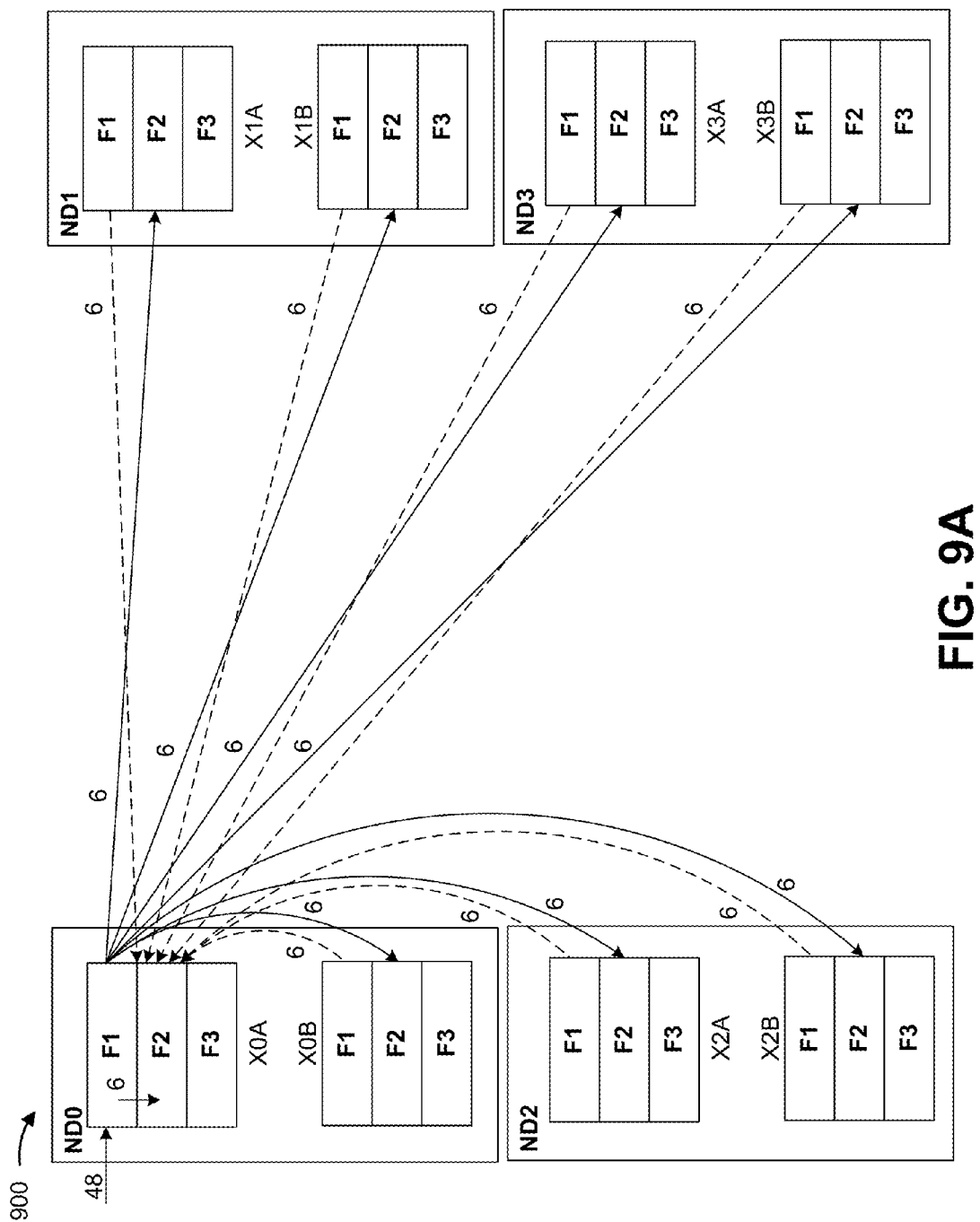
FIGS. 9A and 9B are diagrams of an example implementation of a multi-chassis system that implements a three stage collapsed-distributed Clos architecture for achieving back-to-back fabric connectivity among four network devices.
Figure 9B:
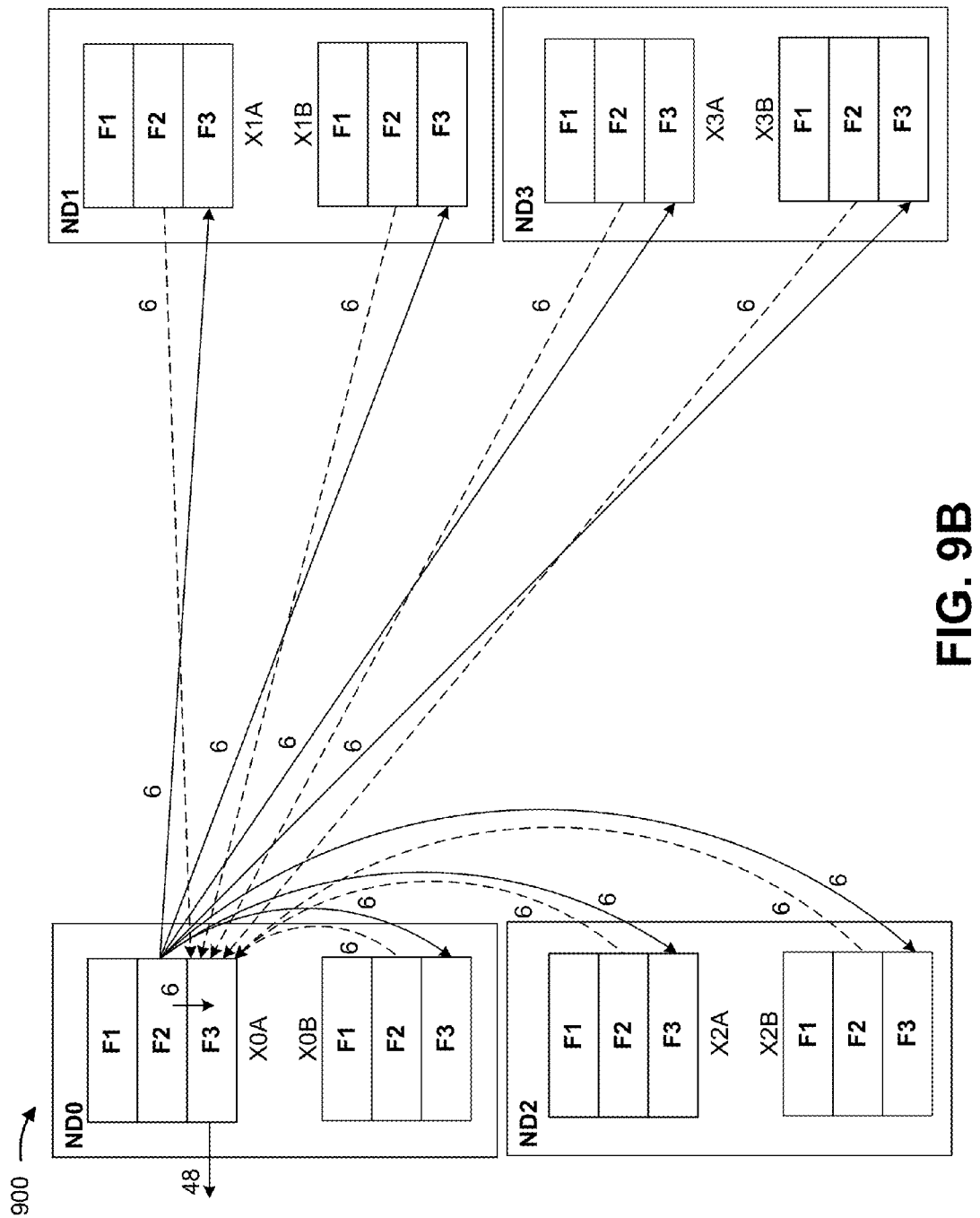

FIGS. 9A and 9B are diagrams of an example implementation 900 of a multi-chassis system that implements a three stage collapsed-distributed Clos architecture for achieving back-to-back fabric connectivity among four network devices. For the purposes of example implementation 900, assume that a first network device 210, identified as ND0, includes a switching component 310 that comprises two crossbars 410, identified as X0A and X0B, that a second network device 210, identified as ND1, includes a switching component 310 that comprises two crossbars 410, identified as X1A and X1B, that a third network device 210, identified as ND2, includes a switching component 310 that comprises two crossbars 410, identified as X2A and X2B, and that a fourth network device 210, identified as ND4, includes a switching component 310 that comprises two crossbars 410, identified as X3A and X3B. Also, assume that the connections to, from, and/or between crossbars 410 are implemented using optical cables and optical links.

For purposes of simplicity, only those connections associated with X0A are shown in example implementation 900. However, each crossbar 410 included in example implementation 900 may include similar connections to those depicted for crossbar X0A. Furthermore, only one fabric plane, associated with switching component 310, is illustrated in example implementation 900, and additional parallel fabric planes may be implemented in a similar manner.

As shown in FIG. 9A, ND0 may be connected to ND1, ND2, and ND4 using a B2B connection that implements a collapsed-distributed Clos architecture. For example, as shown, X0A, X0B, X1A, X1B, X2A, X2B, X3A, and X3B may be partitioned such that each crossbar 410 includes all three Clos stages (e.g., an ingress stage 420 (F1), a portion of middle stage 430 (F2), and an egress stage 440 (F3)), and such that middle stage 430, associated with the Clos fabric, is distributed across each crossbar 410 (e.g., since each crossbar 410 includes a portion of middle stage 430).

As shown, stage F1 on X0A (herein referred to as F1-X0A) may be connected such that F1-X0A may receive packets (e.g., from input components 305), via a total quantity of 48 input links (e.g., assume that each crossbar 410 is size 144× 144, thus each F1 stage may receive packets via 144/3=48 input links), and may provide the packets to all portions of the F2 stage included in the Clos fabric. In other words, F1-X0A may be connected such that F1-X0A may provide packets to F2-X0A via 6 intra-crossbar links, to F2-X0B via 6 intra-chassis links, to F2-X1A via 6 inter-chassis links, to F2-X1B via 6 inter-chassis links, to F2-X2A via 6 inter-chassis links, to F2-X2B via 6 inter-chassis links, to F2-X3A via 6 inter-chassis links, and to F2-X3B via 6 inter-chassis links.

As further shown in FIG. 9A, F2-X0A may be connected such that F2-X0A receives packets, via a total quantity of 48 input links, from each F1 included in the Clos fabric. In other words, F2-X0A may be connected such that F2-X0A may receive packets from F1-X0A via 6 intra-crossbar links (e.g., as described above), from F1-X0B via 6 intra-chassis links, from F1-X1A via 6 inter-chassis links, from F1-X1B via 6 inter-chassis links, from F1-X2A via 6 inter-chassis links, from F1-X2B via 6 inter-chassis links, from F1-X3A via 6 inter-chassis links, and from F1-X3B via 6 inter-chassis links.

As shown in FIG. 9B, F2-X0A may also be connected such that F2-X0A provides packets, via a total quantity of 48 input links, to each F3 included in the Clos fabric. In other words, F2-X0A may be connected such that F2-X0A may provide packets to F3-X0A via 6 intra-crossbar links, to F3-X0B via 6 intra-chassis links, to F3-X1A via 6 inter-chassis links, to F3-X1B via 6 inter-chassis links, to F3-X2A via 6 inter-chassis links, to F3-X2B via 6 inter-chassis links, to F3-X3A via 6 inter-chassis links, and to F3-X3B via 6 inter-chassis links.

As further shown in FIG. 9B, F3-X0A may be connected such that F3-X0A receives packets, via a total quantity of 48 input links, from each portion of the F2 stage included in the Clos fabric. In other words, F3-X0A may be connected such that F3-X0A may receive packets from F2-X0A via 6 intra-crossbar links (e.g., as described above), from F2-X0B via 6 intra-chassis links, from F2-X1A via 6 inter-chassis links, from F2-X1B via 6 inter-chassis links, from F2-X2A via 6 inter-chassis links, from F2-X2B via 6 inter-chassis links, from F2-X3A via 6 inter-chassis links, and from F2-X3B via 6 inter-chassis links. As shown, stage F3-X0A may be connected such that F3-X0A provides packets (e.g., to output components 315) via a total quantity of 48 input links.

As indicated above, FIGS. 9A and 9B are provided merely as an example. Other examples are possible and may differ from what was described with regard to FIGS. 9A and 9B.

FIG. 10 includes a group of tables 1000 that provide information associated with a quantity of optical links and optical cables required to implement the collapsed-distributed Clos architecture shown in example implementation 900 of FIGS. 9A and 9B.

As shown in FIG. 10 by table 1010, and in accordance with example implementation 900, each of the four network devices (L=4) includes two crossbars 410 (e.g., r'=2), for a total of eight crossbars 410 (e.g., r=8). Further, each crossbar 410 may be of size 144×144 (e.g., N=144), resulting in an overall Clos size of 384×384 (e.g., r×N/3=8×144/3=384). For the purposes of FIG. 10, assume that each optical cable, that may be used establish inter-chassis links, includes 16 serializer/deserializers (serdes) (e.g., s=16). As shown by table 1020, a total quantity of serdes for each crossbar (e.g., for the receive direction and the transmit direction) is 144 (e.g., N/3+N/3+N/3=48+48+48=144).

As shown by table 1030, each crossbar 410 included in the four network device B2B connections may include a quantity 12 intra-crossbar (e.g., intra-chip) links (e.g., 2N/3r=2×144/3×8=12), a quantity of 12 inter-crossbar (e.g., inter-chip) links (e.g., 2N/3r×(r'−1)=(2×144/3×8)×(2−1)=12), and a quantity of 72 inter-chassis links (e.g., (r−r')×2N/3r=(8−2)× 2×144/3×8=72). As further shown, the number of optical cables, per network device, for the four network device B2B connections is 9 (e.g., r'×((r−r)×2N/3r)/s=2×((8−2)×2×144/ 3×8)/16=9), and the total quantity of optical cables for the four network device B2B connections is 18 (e.g., Optic Cables per LCC×L/2=9×4/2). Thus, as shown, the number of optical cables to implement the four network device B2B connections using the collapsed-distributed three stage Clos fabric is less than the number of optic cables to implement a traditional solution that uses an independent fabric chassis for the middle stage of the Clos fabric (e.g., 24). Moreover, the collapsed distributed solution may allow for decreased capital expenditures, decreased operational expenditures, and/or decreased system complexity than the traditional solution.

Figure 11A:
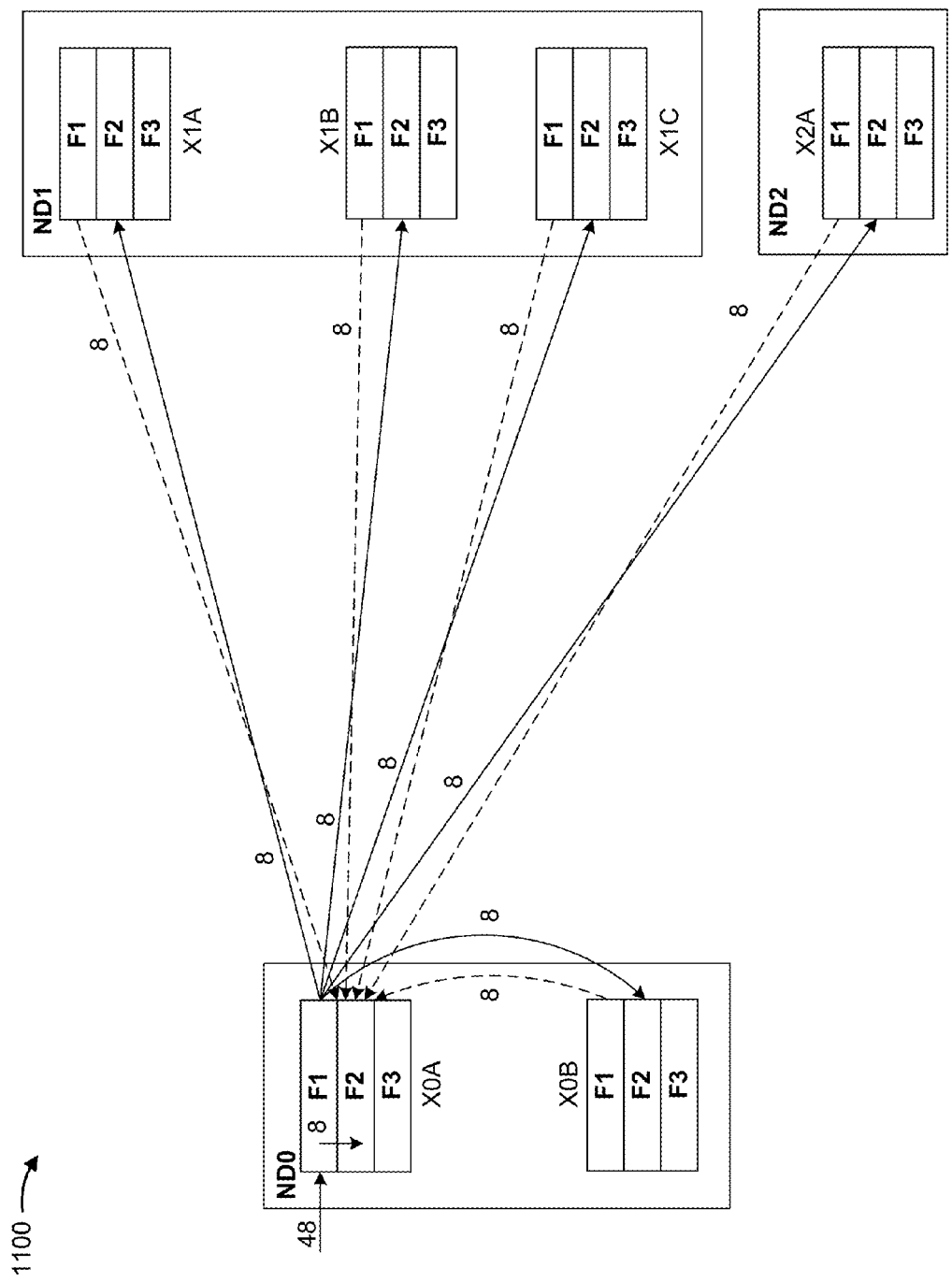
FIGS. 11A and 11B are diagrams of another example implementation of a multi-chassis system that implements a three stage collapsed-distributed Clos architecture for achieving back-to-back fabric connectivity among three network devices.
Figure 11B:
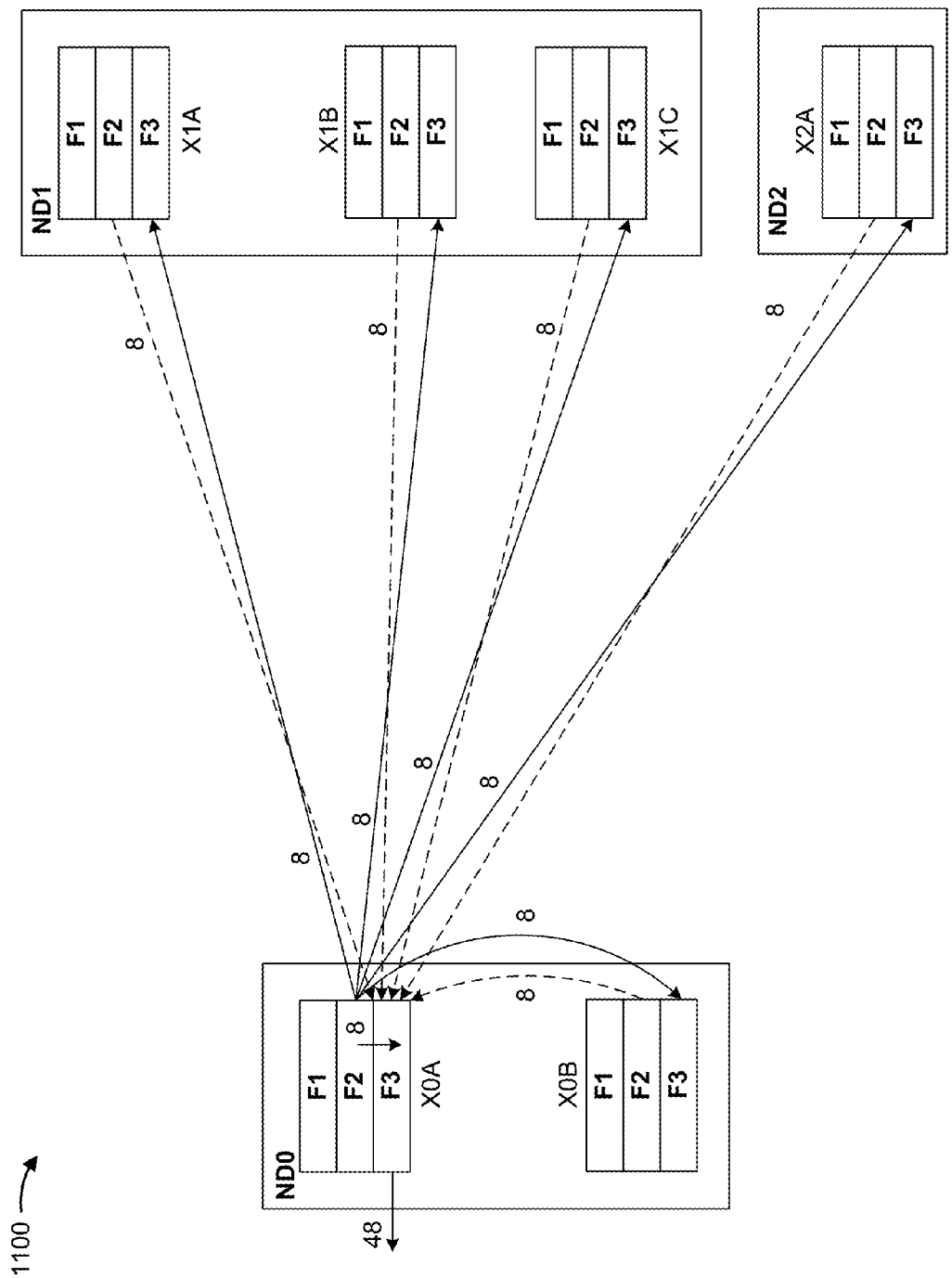

FIGS. 11A and 11B are diagrams of another example implementation 1100 of a multi-chassis system that implements a three stage collapsed-distributed Clos architecture for achieving back-to-back fabric connectivity among three network devices. For the purposes of example implementation 1100, assume that a first network device 210, identified as ND0, includes a switching component 310 that comprises two crossbars 410, identified as X0A and X0B, that a second network device 210, identified as ND1, includes a switching component 310 that comprises three crossbars 410, identified as X1A, X1B, and X1C, and that a third network device 210, identified as ND2, includes a switching component 310 that comprises one crossbar 410, identified as X2A. Also, assume that the connections to, from, and/or between crossbars 410 are implemented using optical cables and optical links.

For purposes of simplicity, only those connections associated with X0A are shown in example implementation 700. However, each crossbar 410 included in example implementation 1100 may include similar connections to those depicted for crossbar X0A. Furthermore, only one fabric plane, associated with switching component 310, is illustrated in example implementation 1100, and additional parallel fabric planes may be implemented in a similar manner.

As shown in FIG. 11A, ND0 may be connected to ND1 and ND2 using a B2B connection that implements a collapsed-distributed Clos architecture. For example, as shown, X0A, X0B, X1A, X1B, X1C, and X2A may be partitioned such that each crossbar 410 includes all three Clos stages (e.g., an ingress stage 420 (F1), a portion of middle stage 430 (F2), and an egress stage 440 (F3)), and such that middle stage 430, associated with the Clos fabric, is distributed across each crossbar 410 (e.g., since each crossbar 410 includes a portion of middle stage 430).

As shown, stage F1 on X0A (herein referred to as F1-X0A) may be connected such that F1-X0A may receive packets (e.g., from input components 305), via a total quantity of 48 input links (e.g., assume that each crossbar 410 is size 144×144, thus each F1 stage may receive packets via 144/3=48 input links), and may provide the packets to all portions of the F2 stage included in the Clos fabric. In other words, F1-X0A may be connected such that F1-X0A may provide packets to F2-X0A via 8 intra-crossbar links, to F2-X0B via 8 intra-chassis links, to F2-X1A via 8 inter-chassis links, to F2-X1B via 8 inter-chassis links, to F2-X1C via 8 inter-chassis links, and to F2-X2A via 8 inter-chassis links.

As further shown in FIG. 11A, F2-X0A may be connected such that F2-X0A receives packets, via a total quantity of 48 input links, from each F1 included in the Clos fabric. In other words, F2-X0A may be connected such that F2-X0A may receive packets from F1-X0A via 8 intra-crossbar links (e.g., as described above), from F1-X0B via 8 intra-chassis links, from F1-X1A via 8 inter-chassis links, from F1-X1B via 8 inter-chassis links, from F1-X1C via 8 inter-chassis links, and from F1-X2A via 8 inter-chassis links.

As shown in FIG. 11B, F2-X0A may also be connected such that F2-X0A provides packets, via a total quantity of 48 input links, to each F3 included in the Clos fabric. In other words, F2-X0A may be connected such that F2-X0A may provide packets to F3-X0A via 8 intra-crossbar links, to F3-X0B via 8 intra-chassis links, to F3-X1A via 8 inter-chassis links, to F3-X1B via 8 inter-chassis links, to F3-X1C via 8 inter-chassis links, and to F3-X2A via 8 inter-chassis links.

As further shown in FIG. 11B, F3-X0A may be connected such that F3-X0A receives packets, via a total quantity of 48 input links, from each portion of the F2 stage included in the Clos fabric. In other words, F3-X0A may be connected such that F3-X0A may receive packets from F2-X0A via 8 intra-crossbar links (e.g., as described above), from F2-X0B via 8 intra-chassis links, from F2-X1A via 8 inter-chassis links, from F2-X1B via 8 inter-chassis links, from F2-X1C via 8 inter-chassis links, and from F2-X2A via 8 inter-chassis links. As shown, stage F3-X0A may be connected such that F3-X0A provides packets (e.g., to output components 315) via a total quantity of 48 input links.

As indicated above, FIGS. 11A and 11B are provided merely as an example. Other examples are possible and may differ from what was described with regard to FIGS. 11A and 11B.

FIGS. 12A and 12B are a group of tables 1200 that include information associated with implementing the collapsed-distributed Clos architecture shown in FIGS. 11A and 11B.

As shown in FIG. 12A by table 1210, and in accordance with example implementation 700, each of the three network devices (L=3) includes a different quantity of two crossbars 410 (e.g., r'=2, r''=3, r'''=1), for a total of six crossbars 410 (e.g., r=6). Further, each crossbar 410 may be of size 144×144 (e.g., N=144), resulting in an overall Clos size of 288×288 (e.g., r×N/3=6×144/3=288). For the purposes of FIGS. 12A and 12B, assume that each optical cable, that may be used to establish inter-chassis links, includes 16 serializer/deserializers (serdes) (e.g., s=16). As shown by table 1220, a total quantity of serdes for each crossbar 410 (e.g., for the receive direction and the transmit direction) is 144 (e.g., N/3+N/3+N/3=48+48+48=144).

As shown by table 1230, each crossbar 410 included in ND0 may include a quantity of 16 intra-crossbar (e.g., intra-chip) links (e.g., 2N/3r=2×144/3×6=16), a quantity of 16 inter-crossbar (e.g., inter-chip) links (e.g., 2N/3r×(r'−1)=(2×144/3×6)×(2−1)=16), and a quantity of 64 inter-chassis links (e.g., (r−r')×2N/3r=(6−2)×2×144/3×6=64). As further shown, each crossbar 410 included in ND1 may include a quantity of 16 intra-crossbar (e.g., intra-chip) links (e.g., 2N/3r=2×144/3×6=16), a quantity of 32 inter-crossbar (e.g., inter-chip) links (e.g., 2N/3r×(r''−1)=(2×144/3×6)×(3−1)=32), and a quantity of 48 inter-chassis links (e.g., (r−r'')×2N/3r=(6−3)×2×144/3×6=48). As further shown crossbar 410 included in ND2 may include a quantity of 16 intra-crossbar (e.g., intra-chip) links (e.g., 2N/3r=2×144/3×6=16), a quantity of 0 inter-crossbar (e.g., inter-chip) links (e.g., 2N/3r×(r'''−1)=(2×144/3×6)×(1−1)=0), and a quantity of 80 inter-chassis links (e.g., (r−r'')×2N/3r=(6−1)×2×144/3×6=80).

As shown in FIG. 12B by table 1240, the number of optical cables to connect ND0 to ND1 is 6 (e.g., [(2N/3r) ×(r'×r'')]/s=[(2×144/3×6)×(2×3)]/16=6), the number of optical cables to connect ND0 to ND2 is 2 (e.g., [(2N/3r)×(r'×r''')]/s=[(2×144/3×6)×(2×1)]/16=2), and the number of optical cables to connect ND1 to ND2 is 3 (e.g., [(2N/3r)×(r''×r''')]/s=[(2×144/3×6)×(1×3)]/16=3). As such, the total quantity of optical cables for the three network device B2B connection is 11 (e.g., 6+3+2=1). Thus, as shown by table 1250, the number of optical cables to implement the three network device B2B connections using the collapsed-distributed three stage Clos fabric (e.g., 11) is less than the number of optical cables to implement a traditional solution that uses an independent fabric chassis for the middle stage of the Clos fabric (e.g., 18). Moreover, the collapsed distributed solution may allow for decreased capital expenditures, decreased operational expenditures, and/or or decreased system complexity than the traditional solution by eliminating the need for one or more separate fabric chassis.

Implementations described herein may provide a collapsed Clos architecture that partitions a crossbar of a network device, that needs to connect to one or more other crossbars via a three stage Clos fabric, such that the crossbar may act not only as the ingress stage and the egress stage of the Clos fabric, but also as a portion of the middle stage of the Clos fabric. In this way, all three stages of the Clos fabric may be collapsed into a single crossbar, and the middle stage may be distributed across multiple crossbars (e.g., on multiple network devices) that are connected together to form the multi-chassis system. The distribution of the middle stage of the Clos fabric may eliminate the need for a separate and/or dedicated middle stage fabric chassis while also reducing a total number of crossbars and required connections. Additionally, the distribution of the middle stage may prevent failure of the entire multi-chassis system when a particular network device, chassis, crossbar, or portion of a crossbar experiences an error (e.g., the middle stage of the Clos fabric may function even when a portion of the middle stage fails). Rather, a failure may lead to a graceful degradation in the total Clos fabric capacity.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system comprising:
a first network device; and
a second network device,
the first network device and the second network device being associated with a Clos architecture,
the first network device including a first plurality of crossbars associated with the Clos architecture,
each of the first plurality of crossbars comprising:
a first crossbar component;
a second crossbar component; and
a third crossbar component; and
the second network device including a second plurality of crossbars associated with the Clos architecture,
each of the second plurality of crossbars comprising:
a fourth crossbar component;
a fifth crossbar component; and
a sixth crossbar component,
the first crossbar component, of each of the first plurality of crossbars, connecting to the second crossbar component of each of the first plurality of crossbars, and the fifth crossbar component of each of the second plurality of crossbars,
the second crossbar component, of each of the first plurality of crossbars, connecting to the first crossbar component of each of the first plurality of crossbars, the third crossbar component of each of the first plurality of crossbars, the fourth crossbar component of each of the second plurality of crossbars, and the sixth crossbar component of each of the second plurality of crossbars,
the third crossbar component, of each of the first plurality of crossbars, connecting to the second crossbar component of each of the first plurality of crossbars, and the fifth crossbar component of each of the second plurality of crossbars,
the fourth crossbar component of each of the second plurality of crossbars, connecting to the second crossbar component of each of the first plurality of crossbars, and the fifth crossbar component of each of the second plurality of crossbars,
the fifth crossbar component, of each of the second plurality of crossbars, connecting to the first crossbar component of each of the first plurality of crossbars, the third crossbar component of each of the first plurality of crossbars, the fourth crossbar component of each of the second plurality of crossbars, and the sixth crossbar component of each of the second plurality of crossbars, and
the sixth crossbar component, of each of the second plurality of crossbars, connecting to the second crossbar component of each of the first plurality of crossbars, and the fifth crossbar component of each of the second plurality of crossbars.

2. The system of claim 1, further comprising a third network device, the third network device including:
a third crossbar, associated with the Clos architecture, comprising:
a seventh crossbar component;
an eighth crossbar component; and
a ninth crossbar component,
the first crossbar component, of each of the first plurality of crossbars, connecting to the eighth crossbar component,
the second crossbar component, of each of the first plurality of crossbars, connecting to the seventh crossbar component and the ninth crossbar component,
the third crossbar component, of each of the first plurality of crossbars, connecting to the eighth crossbar component,
the fourth crossbar component, of each of the second plurality of crossbars, connecting to the eighth crossbar component,
the fifth crossbar component, of each of the second plurality of crossbars, connecting to the seventh crossbar component and the ninth crossbar component,
the sixth crossbar component, of each of the second plurality of crossbars, connecting to the eighth crossbar component,
the seventh crossbar component connecting to the second crossbar component of each of the first plurality of crossbars, the fifth crossbar component of each of the second plurality of crossbars, and the eighth crossbar component, the eighth crossbar component connecting to the first crossbar component of each of the first plurality of crossbars, the third crossbar component of each of the first plurality of crossbars, the fourth crossbar component of each of the second plurality of crossbars, the sixth crossbar component of each of the second plurality of crossbars, the seventh crossbar component, and the ninth crossbar component, and
the ninth crossbar component connecting to the second crossbar component of each of the first plurality of crossbars, the fifth crossbar component of each of the second plurality of crossbars, and the eighth crossbar component.

3. The system of claim 2, further comprising a plurality of other network devices including a fourth network device, the fourth network device including:
a fourth crossbar, associated with the Clos architecture, comprising:
a tenth crossbar component;
an eleventh crossbar component; and
a twelfth crossbar component,
the first crossbar component, of each of the first plurality of crossbars, connecting to the eleventh crossbar component, the second crossbar component, of each of the first plurality of crossbars, connecting to the tenth crossbar component and the twelfth crossbar component, the third crossbar component, of each of the first plurality of crossbars, connecting to the eleventh crossbar component, the fourth crossbar component, of each of the second plurality of crossbars, connecting to the eleventh crossbar component, the fifth crossbar component, of each of the second plurality of crossbars, connecting to the tenth crossbar component and the twelfth crossbar component, the sixth crossbar component, of each of the second plurality of crossbars, connecting to the eleventh crossbar component, the seventh crossbar component connecting to the eleventh crossbar component, the eighth crossbar component connecting to the tenth crossbar component and the twelfth crossbar component, the ninth crossbar component connecting to the eleventh crossbar component, the tenth crossbar component connecting to the second crossbar component of each of the first plurality of crossbars, the fifth crossbar component of each of the second plurality of crossbars, the eighth crossbar component, and the eleventh crossbar component, the eleventh crossbar component connecting to the first crossbar component of each of the first plurality of crossbars, the third crossbar component of each of the first plurality of crossbars, the fourth crossbar component of each of the second plurality of crossbars, the sixth crossbar component of each of the second plurality of crossbars, the seventh crossbar component, the ninth crossbar component, the tenth crossbar component, and the twelfth crossbar component, and the twelfth crossbar component connecting to the second crossbar component of each of the first plurality of crossbars, the fifth crossbar component of each of the second plurality of crossbars, the eighth crossbar component, and the eleventh crossbar component.

4. The system of claim 1, where the first crossbar component is associated with an ingress stage of the Clos architecture:

the second crossbar component is associated with a portion of a middle stage of the Clos architecture;

the third crossbar component is associated with an egress stage of the Clos architecture;

the fourth crossbar component is associated with the ingress stage of the Clos architecture;

the fifth crossbar component is associated with another portion of the middle stage of the Clos architecture; and the sixth crossbar component is associated with the egress stage of the Clos architecture.

5. The system of claim 1, where the first plurality of crossbars are implemented on a chip of the first network device and the second plurality of crossbars are implemented on a chip of the second network device.

6. The system of claim 1, where the first crossbar component, of each of the first plurality of crossbars, sends a first set of packets to the second crossbar component of each of the first plurality of crossbars, and to the second crossbar component of each of the second plurality of crossbars, where the first crossbar component, of each of the second plurality of crossbars, sends a second set of packets to the first crossbar component of each of the first plurality of crossbars, and where the second crossbar component, of each of the second plurality of crossbars, sends a third set of packets to the third crossbar component of each of the first plurality of crossbars, and to the third crossbar component of each of the second plurality of crossbars.

7. The system of claim 6, where the second crossbar component, of each of the first plurality of crossbars, sends a fourth set of packets to the third crossbar component of each of the first plurality of crossbars, and to the third crossbar component of each of the second plurality of crossbars.

8. A system comprising:

a first device; and a second device, the first device and the second device being associated with a Clos architecture, the first device including a plurality of crossbars associated with the Clos architecture, each of the plurality of crossbars comprising:

a first crossbar component;

a second crossbar component; and a third crossbar component; and the second device including a set of crossbars associated with the Clos architecture, a first crossbar, of the set of crossbars, comprising:

a fourth crossbar component;

a fifth crossbar component; and a sixth crossbar component, the first crossbar component, of each of the plurality of crossbars, connecting to the second crossbar component of each of the plurality of crossbars, and the fifth crossbar component, the second crossbar component, of each of the plurality of crossbars, connecting to the first crossbar component of each of the plurality of crossbars, the third crossbar component of each of the plurality of crossbars, the fourth crossbar component, and the sixth crossbar component, the third crossbar component, of each of the plurality of crossbars, connecting to the second crossbar component of each of the plurality of crossbars, and the fifth crossbar component, the fourth crossbar component connecting to the second crossbar component of each of the plurality of crossbars, and the fifth crossbar component, the fifth crossbar component connecting to the first crossbar component of each of the plurality of crossbars, the third crossbar component of each of the plurality of crossbars, the fourth crossbar component, and the sixth crossbar component, and the sixth crossbar component connecting to the second crossbar component of each of the plurality of crossbars, and the fifth crossbar component.

9. The system of claim 8, further comprising a third device, the third device including:

a second crossbar, associated with the Clos architecture, comprising:

a seventh crossbar component;

an eighth crossbar component; and a ninth crossbar component, the first crossbar component, of each of the plurality of crossbars, connecting to the eighth crossbar component, the second crossbar component, of each of the plurality of crossbars, connecting to the seventh crossbar component and the ninth crossbar component, the third crossbar component, of each of the plurality of crossbars, connecting to the eighth crossbar component, the fourth crossbar component connecting to the eighth crossbar component, the fifth crossbar component connecting to the seventh crossbar component and the ninth crossbar component, the sixth crossbar component connecting to the eighth crossbar component, the seventh crossbar component connecting to the second crossbar component of each of the plurality of crossbars, the fifth crossbar component, and the eighth crossbar component, the eighth crossbar component connecting to the first crossbar component of each of the plurality of crossbars, the third crossbar component of each of the plurality of crossbars, the fourth crossbar component, the sixth crossbar component, the seventh crossbar component, and the ninth crossbar component, and the ninth crossbar component connecting to the second crossbar component of each of the plurality of crossbars, the fifth crossbar component, and the eighth crossbar component.

10. The system of claim 9, further comprising a plurality of other devices including a fourth device, the fourth device including:

a third crossbar, associated with the Clos architecture, comprising:

a tenth crossbar component;

an eleventh crossbar component; and a twelfth crossbar component, the first crossbar component, of each of the plurality of crossbars, connecting to the eleventh crossbar component, the second crossbar component, of each of the plurality of crossbars, connecting to the tenth crossbar component and the twelfth crossbar component, the third crossbar component, of each of the plurality of crossbars, connecting to the eleventh crossbar component, the fourth crossbar component connecting to the eleventh crossbar component, the fifth crossbar component connecting to the tenth crossbar component and the twelfth crossbar component, the sixth crossbar component connecting to the eleventh crossbar component, the seventh crossbar component connecting to the eleventh crossbar component, the eighth crossbar component connecting to the tenth crossbar component and the twelfth crossbar component, the ninth crossbar component connecting to the eleventh crossbar component, the tenth crossbar component connecting to the second crossbar component of each of the plurality of crossbars, the fifth crossbar component, the eighth crossbar component, and the eleventh crossbar component, the eleventh crossbar component connecting to the first crossbar component of each of the plurality of crossbars, the third crossbar component of each of the plurality of crossbars, the fourth crossbar component, the sixth crossbar component, the seventh crossbar component, the ninth crossbar component, the tenth crossbar component, and the twelfth crossbar component, and the twelfth crossbar component connecting to the second crossbar component of each of the plurality of crossbars, the fifth crossbar component, the eighth crossbar component, and the eleventh crossbar component.

11. The system of claim 8, where the second device includes a second crossbar, associated with the Clos architecture, comprising:

a seventh crossbar component;

an eighth crossbar component; and a ninth crossbar component, the first crossbar component, of each of the plurality of crossbars, connecting to the eighth crossbar component, the second crossbar component, of each of the plurality of crossbars, connecting to the seventh crossbar component and the ninth crossbar component, the third crossbar component, of each of the plurality of crossbars, connecting to the eighth crossbar component, the fourth crossbar component connecting to the eighth crossbar component, the fifth crossbar component connecting to the seventh crossbar component and the ninth crossbar component, the sixth crossbar component connecting to the eighth crossbar component, the seventh crossbar component connecting to the second crossbar component of each of the plurality of crossbars, the fifth crossbar component, and the eighth crossbar component, the eighth crossbar component connecting to the first crossbar component of each of the plurality of crossbars, the third crossbar component of each of the plurality of crossbars, the fourth crossbar component, the sixth crossbar component, the seventh crossbar component, and the ninth crossbar component, and the ninth crossbar component connecting to the second crossbar component of each of the plurality of crossbars, the fifth crossbar component, and the eighth crossbar component.

12. The system of claim 11, where the second device includes a third crossbar, associated with the Clos architecture, comprising:

a tenth crossbar component;

an eleventh crossbar component; and a twelfth crossbar component, the first crossbar component, of each of the plurality of crossbars, connecting to the eleventh crossbar component, the second crossbar component, of each of the plurality of crossbars, connecting to the tenth crossbar component and the twelfth crossbar component, the third crossbar component, of each of the plurality of crossbars, connecting to the eleventh crossbar component, the fourth crossbar component connecting to the eleventh crossbar component, the fifth crossbar component connecting to the tenth crossbar component and the twelfth crossbar component,
the sixth crossbar component connecting to the eleventh crossbar component,
the seventh crossbar component connecting to the eleventh crossbar component,
the eighth crossbar component connecting to the tenth crossbar component and the twelfth crossbar component,
the ninth crossbar component connecting to the eleventh crossbar component,
the tenth crossbar component connecting to the second crossbar component, the fifth crossbar component, the eighth crossbar component, and the eleventh crossbar component,
the eleventh crossbar component connecting to the first crossbar component of each of the plurality of crossbars, the third crossbar component of each of the plurality of crossbars, the fourth crossbar component, the sixth crossbar component, the seventh crossbar component, the ninth crossbar component, the tenth crossbar component, and the twelfth crossbar component, and
the twelfth crossbar component connecting to the second crossbar component of each of the plurality of crossbars, the fifth crossbar component, the eighth crossbar component, and the eleventh crossbar component.

13. The system of claim 8, where the first crossbar component is associated with an ingress stage of the Clos architecture:
the second crossbar component is associated with a portion of a middle stage of the Clos architecture;
the third crossbar component is associated with an egress stage of the Clos architecture;
the fourth crossbar component is associated with the ingress stage of the Clos architecture;
the fifth crossbar component is associated with another portion of the middle stage of the Clos architecture; and
the sixth crossbar component is associated with the egress stage of the Clos architecture.

14. The system of claim 8, where each of the plurality of crossbars is implemented on a chip of the first device and the first crossbar is implemented on a chip of the second device.

15. A system comprising:
a first device;
a second device; and
a third device,
the first device including a first set of crossbars, each of the first set of crossbars comprising:
a first crossbar component;
a second crossbar component; and
a third crossbar component;
the second device including a second set of crossbars, each of the second set of crossbars comprising:
a fourth crossbar component;
a fifth crossbar component; and
a sixth crossbar component;
the third device including a third set of crossbars, each of the third set of crossbars comprising:
a seventh crossbar component;
an eighth crossbar component; and
a ninth crossbar component,
the first crossbar component, of each of the first set of crossbars, connecting to the second crossbar component of each of the first set of crossbars, the fifth crossbar component of each of the second set of crossbars, and the eighth crossbar component of each of the third set of crossbars,
the second crossbar component, of each of the first set of crossbars, connecting to the first crossbar component of each of the first set of crossbars, the third crossbar component of each of the first set of crossbars, the fourth crossbar component of each of the second set of crossbars, the sixth crossbar component of each of the second set of crossbars, the seventh crossbar component of each of the third set of crossbars, and the ninth crossbar component of each of the third set of crossbars,
the third crossbar component, of each of the first set of crossbars, connecting to the second crossbar component of each of the first set of crossbars, the fifth crossbar component of each of the second set of crossbars, and the eighth crossbar component of each of the third set of crossbars,
the fourth crossbar component, of each of the second set of crossbars, connecting to the second crossbar component of each of the first set of crossbars, the fifth crossbar component of each of the second set of crossbars, and the eighth crossbar component of each of the third set of crossbars,
the fifth crossbar component of each of the second set of crossbars connecting to the first crossbar component of each of the first set of crossbars, the third crossbar component of each of the first set of crossbars, the fourth crossbar component of each of the second set of crossbars, the sixth crossbar component of each of the second set of crossbars, the seventh crossbar component of each of the third set of crossbars, and the ninth crossbar component of each of the third set of crossbars,
the sixth crossbar component, of each of the second set of crossbars, connecting to the second crossbar component of each of the first set of crossbars, the fifth crossbar component of each of the second set of crossbars, and the eighth crossbar component of each of the third set of crossbars,
the seventh crossbar component, of each of the third set of crossbars, connecting to the second crossbar component of each of the first set of crossbars, the fifth crossbar component of each of the second set of crossbars, and the eighth crossbar component of each of the third set of crossbars,
the eighth crossbar component, of each of the third set of crossbars, connecting to the first crossbar component of each of the first set of crossbars, the third crossbar component of each of the first set of crossbars, the fourth crossbar component of each of the second set of crossbars, the sixth crossbar component of each of the second set of crossbars, the seventh crossbar component of each of the third set of crossbars, and the ninth crossbar component of each of the third set of crossbars, and
the ninth crossbar component, of each of the third set of crossbars, connecting to the second crossbar component of each of the first set of crossbars, the fifth crossbar component of each of the second set of crossbars, and the eighth crossbar component of each of the third set of crossbars.

16. The system of claim 15, further comprising a plurality of other devices including a fourth device, the fourth device including:
a fourth crossbar comprising:
a tenth crossbar component;
an eleventh crossbar component; and
a twelfth crossbar component,
the first crossbar component, of each of the first set of crossbars, connecting to the eleventh crossbar component,
the second crossbar component, of each of the first set of crossbars, connecting to the tenth crossbar component and the twelfth crossbar component,
the third crossbar component, of each of the first set of crossbars, connecting to the eleventh crossbar component,
the fourth crossbar component, of each of the second set of crossbars, connecting to the eleventh crossbar component,
the fifth crossbar component, of each of the second set of crossbars, connecting to the tenth crossbar component and the twelfth crossbar component,
the sixth crossbar component, of each of the second set of crossbars, connecting to the eleventh crossbar component,
the seventh crossbar component, of each of the third set of crossbars, connecting to the eleventh crossbar component,
the eighth crossbar component, of each of the third set of crossbars, connecting to the tenth crossbar component and the twelfth crossbar component,
the ninth crossbar component, of each of the third set of crossbars connecting to the eleventh crossbar component,
the tenth crossbar component connecting to the second crossbar component of each of the first set of crossbars, the fifth crossbar component of each of the second set of crossbars, the eighth crossbar component of each of the third set of crossbars, and the eleventh crossbar component,
the eleventh crossbar component connecting to the first crossbar component of each of the first set of crossbars, the third crossbar component of each of the first set of crossbars, the fourth crossbar component of each of the second set of crossbars, the sixth crossbar component of each of the second set of crossbars, the seventh crossbar component of each of the third set of crossbars, the ninth crossbar component of each of the third set of crossbars, the tenth crossbar component, and the twelfth crossbar component, and
the twelfth crossbar component connecting to the second crossbar component of each of the first set of crossbars, the fifth crossbar component of each of the second set of crossbars, the eighth crossbar component of each of the third set of crossbars, and the eleventh crossbar component.

17. The system of claim 15, where the first crossbar component is associated with an ingress stage of a Clos architecture:
the second crossbar component is associated with a first portion of a middle stage of the Clos architecture;
the third crossbar component is associated with an egress stage of the Clos architecture;
the fourth crossbar component is associated with the ingress stage of the Clos architecture;
the fifth crossbar component is associated with a second portion of the middle stage of the Clos architecture;
the sixth crossbar component is associated with the egress stage of the Clos architecture;
the seventh crossbar component is associated with the ingress stage of the Clos architecture;
the eighth crossbar component is associated with a third portion of the middle stage of the Clos architecture; and
the ninth crossbar component is associated with the egress stage of the Clos architecture.

18. The system of claim 15, where the first set of crossbars are implemented on a chip of the first device, the second set of crossbars are implemented on a chip of the second device, and the third set of crossbars are implemented on a chip of the third device.

19. The system of claim 15, where each connection is an optical link.

20. The system of claim 15, where the system is a multi-chassis system.

* * * * *